United States Patent
Ide et al.

(10) Patent No.: US 8,640,015 B2
(45) Date of Patent: *Jan. 28, 2014

(54) ANOMALY DETECTION BASED ON DIRECTIONAL DATA

(75) Inventors: Tsuyoshi Ide, Kawasaki (JP); Keisuke Inoue, Sagamihara (JP); Toshiyuki Yamane, Yamato (JP); Hironori Takeuchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1288 days.

This patent is subject to a terminal disclaimer.

(21) Appl. No.: 12/145,067

(22) Filed: Jun. 24, 2008

(65) Prior Publication Data

US 2008/0263663 A1 Oct. 23, 2008

Related U.S. Application Data

(63) Continuation of application No. 11/195,456, filed on Aug. 2, 2005, now Pat. No. 7,406,653.

(30) Foreign Application Priority Data

Aug. 2, 2004 (JP) ................................. 2004-226163

(51) Int. Cl.
*G06F 11/00* (2006.01)
(52) U.S. Cl.
USPC ............. 714/799; 714/760; 712/76; 382/197; 707/100
(58) Field of Classification Search
USPC ................... 714/799, 760; 712/26; 382/197; 707/100; 6/799
See application file for complete search history.

(56) References Cited

U.S. PATENT DOCUMENTS

| | | |
|---|---|---|
| 4,882,733 A | 11/1989 | Tanner |
| 5,050,069 A | 9/1991 | Hillis et al. |
| 5,127,022 A | 6/1992 | Takegahara et al. |

(Continued)

FOREIGN PATENT DOCUMENTS

JP  10254899 A  9/1998

OTHER PUBLICATIONS

A. Banerjee, et al., "Generative Model-Based Clustering of Directional Data," Proceedings of the Ninth ACM SIGKDD International Conference on Knowledge Discovery and Data Mining, pp. 19-28, 2003.

(Continued)

*Primary Examiner* — M. Mujtaba K Chaudry
(74) *Attorney, Agent, or Firm* — Cantor Colburn LLP; Vazken Alexanian

(57) ABSTRACT

Properly detects an anomaly on the basis of directional data that are obtained in sequence from a monitored object. An anomaly detecting method includes: sequentially generating directional data indicating a feature of each piece of monitored data correspondingly to the monitored data which are input in sequence; calculating the dissimilarity of the directional data to a reference vector; updating a moment of the distribution of the dissimilarity appearing when the directional data is modeled with a multi-dimensional probability distribution, based on the moment already corresponding to the monitored data; calculating a parameter determining the variance of the multi-dimensional probability distribution, on the basis of the moment; calculating a threshold of the dissimilarity on the basis of the multi-dimensional probability distribution the variance of which is determined by the parameter; and detecting an anomaly in the monitored data that corresponds to the dissimilarity if the dissimilarity exceeds the threshold.

16 Claims, 10 Drawing Sheets

(56) References Cited

U.S. PATENT DOCUMENTS

| | | | |
|---|---|---|---|
| 5,271,022 A | | 12/1993 | Berlekamp et al. |
| 5,659,631 A | | 8/1997 | Gormish et al. |
| 5,742,041 A | * | 4/1998 | Liu .................... 235/462.08 |
| 5,778,415 A | | 7/1998 | Marietta et al. |
| 5,818,032 A | | 10/1998 | Sun et al. |
| 5,917,945 A | * | 6/1999 | Cymbalski .................... 382/192 |
| 5,959,285 A | | 9/1999 | Schuessler |
| 5,974,172 A | | 10/1999 | Chen |
| 6,351,713 B1 | | 2/2002 | Board et al. |
| 7,065,534 B2 | * | 6/2006 | Folting et al. .................... 707/603 |
| 7,162,489 B2 | | 1/2007 | Folting et al. |
| 7,191,096 B1 | | 3/2007 | Gross et al. |

OTHER PUBLICATIONS

Scott C. Deerwester, et al., "Indexing by Latent Semantic Analysis," Journal of the American Society of Information Science, vol. 41, No. 6, pp. 391-407, 1990.

M. Ghil, et al., "Advanced Spectral Methods for Climatic Time Series," Reviews of Geophysics, 40, 2002, pp. 1-41.

T. Joachims, "Text Categorization with Support Vector Machines: Learning with Many Relevant Features," Proceedings of ECML, pp. 1-7, 1998.

H. Li and K. Yamanishi, "Text Classification using ESC-based Stochastic Decision Lists," Proceedings of the ACM CIKM, pp. 122-130, 1999.

C.D. Manning and H. Schutze, "Foundation of Statistical Natural Language Processing," MIT Press, Section 7.2.1 Only, pp. 1-9, 2000.

David Marchette, "A Statistical Method for Profiling Network Traffic," Workshop on Intrusion Detection and Network Monitoring, pp. 119-128, 1999.

Tom Mitchel, "Machine Learning," McGraw Hill, Chapter 6 Only, pp. 1-49, 1997.

Nadeem Ahmed Syed, et al, "Handling Concept Drifts in Incremental Learning with Support Vector Machines," Proceedings of the fifth ACM SIGKK International Conference on Knowledge Discovery and Data Mining, pp. 317-321, 1999.

* cited by examiner

ANOMALY DETECTION BASED ON DIRECTIONAL DATA

CROSS-REFERENCE TO RELATED APPLICATIONS

This application is a continuation of U.S. patent application Ser. No. 11/195,456, filed Aug. 2, 2005, which is now U.S. Pat. No. 7,406,653, which claims priority to Japanese Patent Application No. 2004-226163, filed Aug. 2, 2004, and all the benefits accruing therefrom under 35 U.S.C. §119, the contents of which in its entirety are herein incorporated by reference.

FIELD OF THE INVENTION

The present invention relates to an anomaly detecting apparatus, an anomaly detecting method, an anomaly detecting program, and a recording medium. In particular, the present invention relates to an anomaly detecting apparatus, an anomaly detecting method, an anomaly detecting program, and a recording medium for properly detecting an anomaly on the basis of directional data which are obtained in sequence from a monitored object.

BACKGROUND ART

Methods for determining the degree of an anomaly in multi-dimensional data in a system in which multi-dimensional data are sequentially generated or obtained have been proposed in various fields in the real world.

The following documents are considered herein:
[Patent Document 1]
Published Unexamined Patent Application No. 10-254899
[Non-Patent Document 1]
David Marchette, "A Statistical Method for Profiling Network Traffic", Workshop on Intrusion Detection and Network Monitoring, 1999, pp. 119-128
[Non-Patent Document 2]
Kenji Kita, Kazuhiko Tsuda, and Masami Shishibori, "Information retrieval algorithm", Kyoritsu Shuppan, 2002
[Non-Patent Document 3]
Nadeem Ahmed Syed, Huan Liu, and Kah Kay Sung, "Handling concept drifts in incremental learning with support vector machines", "Proceedings of the fifth ACM SIGKDD International Conference on Knowledge Discovery and Data Mining, pp. 317-321, 1999
[Non-Patent Document 4]
Tom M. Mitchel, "Machine Learning", McGraw Hill, Chapter 6, 1997
[Non-Patent Document 5]
A. Banerjee, I. Dhillon, J. Ghosh, and S. Sra, "Generative model-based clustering of directional data", Proceedings of the Ninth ACM SIGKDD International Conference on Knowledge Discovery and Data Mining, pp. 19-28, 2003
[Non-Patent Document 6]
Scott C. Deerwester, Susan T. Dumais, Thomas K. Landauer, George W. Furnas, Richard A. Harshman, "Indexing by Latent Semantic Analysis", Journal of the American Society of Information Science, Vol. 41, No. 6, pp. 391-407, 1990
[Non-Patent Document 7]
C. D. Manning and H. Schutze, "Foundation of Statistical Natural Language Processing", MIT Press, Section 7.2.1, 2000
[Non-Patent Document 8]
T. Joachims, "Text categorization with support vector machines: Learning with many relevant features", Proceedings of ECML, 1998
[Non-Patent Document 9]
H. Li and K. Yamanishi, "Text classification using ESC-based stochastic decision lists", Proceedings of the ACM CIKM, pp. 122-130, 1999
[Non-Patent Document 10]
M. Ghil, M. R. Allen, M. D. Dettinger, K. Ide, D. Kondrashov, M. E. Mann, A. W. Robertson, A. Saunders, Y. Tian, F. Varadi, and P. Yiou, "Advanced Spectral Methods for Climatic Time Series", Reviews of Geophysics, 40 (2002), pp. 1-41, 2002
[Non-Patent Document 11]
N. Golyandina, V. Nekrutkin and A. Zhigljavsky, "Analysis of Time Series Structure: SSA and Related techniques", Chapman and Hall/CRC 2001

For example, in a study, the probability of connection requests to each port number of a computer system is represented by a feature vector and an intrusion into the computer system is detected by using a clustering technique for the feature vectors (see Non-Patent Document 1).

The method described above can be used in text information processing. For example, in a text classification problem, a text is represented by a vector which has elements consisting of the occurrence frequency of words or elements consisting of the quantity obtained by converting the occurrence frequency of words by using tf-idf. This type of modeling of text data is called a vector-space model (see Non-Patent Document 2). Then, the similarity, such as the cosine measure, of the text vector of text to be classified newly to the typical vector of a each category is calculated and, from the similarity, whether or not the text belongs to the category is determined or whether or not classification performed by using a classifier is proper (see Patent Document 1, for example). This processing classifies the text vector according to its dissimilarity to the known typical vector and therefore it can be said that the text classification problem is a form of anomaly detection.

(1) Directional Data:

In anomaly detection in multi-dimensional data, the data in which an anomaly is to be detected is often normalized to directional data. Directional data can be defined as a vector whose $L_2$ norm is normalized to a constant value such as 1 (that is, a vector where the sum of squares of the elements is equal to a constant value such as 1). Therefore, the directional data is data only whose direction has a meaning. For example, in a text classification problem, a text vector, which is a multi-dimensional vector, is generated based on the occurrence frequency of a word. It is necessary to generate the directional vector by normalizing the text vector to a certain norm in order to properly compare the similarities because the larger the total number of the words in the text, the greater the norm of the text vector.

While in some cases, a vector may be used whose $L_1$ norm, instead of $L_2$ norm, is normalized in the meaning of normalizing the probability (see Non-Patent Document 1), each element can be readily reformulated so as to represent the probability amplitude (that is, a quantity the square of the absolute value of which gives probability) and therefore the problem using a vector whose $L_1$ norm is normalized resolves itself into a directional data problem.

As has been described above, the problem of detecting an anomaly by comparing directional data provided by normalizing monitored data with a reference vector can be applied to various fields. Hereinafter, an object in which anomaly is detected in this way is called a "dynamic system."

(2) Distance Measure of Directional Data:

As the distance measure used in comparison between a directional data item and a reference vector, the cosine measure defined by Expression (1) is widely used.

[Expression 1]

$$z = 1 - r^T u \qquad (1)$$

Here, r denotes a predetermined reference vector (directional data), u denotes an observation vector (directional data) observed from a monitored dynamic system, and the superscript T denotes transpose. As apparent from Expression (1), z is equal to 0 if the observation vector matches the reference vector, but is equal to 1 if the observation vector is orthogonal to the reference vector. Because of this nature, z can be used as the index of the dissimilarity of the observation vector to the reference vector.

(3) Anomaly Detection:

In a text classification problem, if the dissimilarity z in Expression (1) of an observation vector u obtained from given text data to the reference vector r corresponding to a given category exceeds a threshold $z_{th}$ ($z > z_{th}$), it is usually determined that the text data does not belong to the category. That is, a reference vector r and a threshold $z_{th}$ are set for each category and the dissimilarity z is compared with the threshold $z_{th}$ for each category to determine whether or not the text data belongs to the category.

The following are problems to be solved by the invention. The art described above have the following problems:

(1) Difficulty of Setting (the) Thresholding Condition

In the anomaly detecting method described above, appropriate determination criteria must be set. However, it is difficult to set appropriate determination criteria with the prior arts. More specifically, if the nature of a text to be classified and the set of the texts to be classified are known, the anomaly thresholding condition can be found based on the result of classification of the text data. However, in a case where unknown text data arrive sequentially online, t is difficult to set a threshold $z_{th}$ properly even if the values of already arrived data are available. This is because it is difficult to properly evaluate the size of each cluster resulting from the classification. In conventional approaches, the threshold $z_{th}$ is determined typically by comparing the deviation from the average value with standard deviation, assuming that the distribution of dissimilarity z is substantially equivalent to normal distribution. Generally, this assumption does not hold. Especially when directional data is used, it is not appropriate to use this assumption because the directional data is normalized.

(2) Difficulty of Updating the Thresholding Condition

In a state where observational data arrive in succession online, it is desirable that the thresholding condition be updated appropriately. However, except in special cases where the dissimilarity z is normal distribution, it is difficult to obtain the distribution function of the dissimilarity z. Accordingly, it is difficult to respond to changes in the thresholding condition over time with conventional approaches. For example, in a text classification problem, it is a significant challenge to capture the drift of categories from a practical standpoint. To respond to changes in the thresholding condition over time is one of the main subjects in machine learning (see for example Non-Patent Document 3), and it is desired to solve the problem.

(3) Difficulty of Dealing with Directional Data

The degree of freedom of directional data is smaller than the dimension of the vector space by 1 due to the condition that its norm is constant. Therefore, directional data is seemingly easier to deal with than vectors without normalization. However, dimensional data is statistically more difficult to deal with. That is, if each dimension of a multi-dimensional vector is independent, its dispersion can be properly modeled by using multi-dimensional normal distribution. The normal distribution is considerably easy to deal with mathematically. For example, it is well known that a multi-dimensional vector classification problem can be formulated mathematically into a maximum likelihood estimation problem of mixed normal distribution and can be readily solved with the so-called expectation maximization method (see for example Non-Patent Document 4). Therefore, it may be possible to deal with directional data with normal distribution by neglecting normalization conditions and assuming the degrees of freedom to be independent of each other. However, it is empirically known that this method does not provide an appropriate model.

In this way, because directional data u is normalized, natural distribution of the directional data u is not multi-dimensional normal distribution. Letting the direction corresponding to the reference vector r be the mean direction, the distribution that provides the maximum entropy for directional data u distributed around that direction is the von Mises-Fisher distribution shown in the Expression (2).

[Expression 2]

$$f(u \mid r, \Sigma) = \frac{\Sigma^{1-N/2}}{(2\pi)^{N/2} I_{N/2-1}(1/\Sigma)} \exp(r^T u / \Sigma) \qquad (2)$$

Here, N denotes the dimension of the reference vector and the directional data, $\Sigma$ denotes a scalar parameter that defines the variance of the von Mises-Fisher distribution, and $I_v(c)$ denotes the modified Bessel function of the first kind of v stages.

Considering that the maximum entropy principle gives the multi-dimensional normal distribution if the constraint of norm is removed, it is obvious that the von Mises-Fisher distribution is the most natural (most expressive) distribution for the directional data. Accordingly, the anomaly detection problem for the directional data u can be formulated in principle by using the von Mises-Fisher distribution or its mixture models.

However, because the von Mises-Fisher distribution is difficult to deal with mathematically (especially because it contains the modified Bessel function), it has not thoroughly been discussed in the context of anomaly detection in the past. It was not until recently that formulation with the expectation maximization method of the von Mises-Fisher distribution was discussed in the context of clustering (see Non-Patent Document 5). Moreover, because the maximum likelihood estimation of the von Mises-Fisher distribution involves complex mathematical operations including approximation of the special function in Expression (3) and the solution to the maximum likelihood equation is given as the solution to a transcendental equation, it is difficult to provide rules for updating parameters that determine the distribution online.

SUMMARY OF THE INVENTION

Therefore, an aspect of the present invention is to provide an anomaly detecting apparatus, an anomaly detecting method, an anomaly detecting program, and recording medium relating to the anomaly detecting apparatus, which can solve the above problems. The aspect is achieved by a combination of features set forth in the independent claims. The dependent claims define further advantageous specific embodiments of the present invention.

An example of the anomaly detecting apparatus detects an anomaly in monitored data. It includes: a directional data generating portion for sequentially generating directional data which are unit vectors indicating a feature of each piece of monitored data correspondingly to the monitored data which are input in sequence; a dissimilarity calculating portion for calculating the dissimilarity of the directional data to a pre-specified reference vector; a moment updating portion for updating a moment of the distribution of the dissimilarity appearing when the directional data is modeled with a multidimensional probability distribution, on the basis of the moment already calculated and the dissimilarity of the directional data to a new piece of the monitored data; a parameter calculating portion for calculating a parameter determining the variance of the multi-dimensional probability distribution, on the basis of the moment; a threshold calculating portion for calculating a threshold of the dissimilarity on the basis of the multi-dimensional probability distribution the variance of which is determined by the parameter; and an anomaly detecting portion for detecting an anomaly in the monitored data that corresponds to the dissimilarity if the dissimilarity exceeds the threshold.

The summary of the invention provided above does not enumerate all essential features of the present invention. Sub-combinations of the features also can constitute the present invention. Thus according to the present invention, an anomaly can be properly detected based on directional data sequentially obtained from a monitored aspect.

BRIEF DESCRIPTION OF THE DRAWINGS

These and other objects and features of the present invention will become clear from the following description taken in conjunction with the accompanying drawings, in which.

DESCRIPTION OF SYMBOLS

Figure 1:
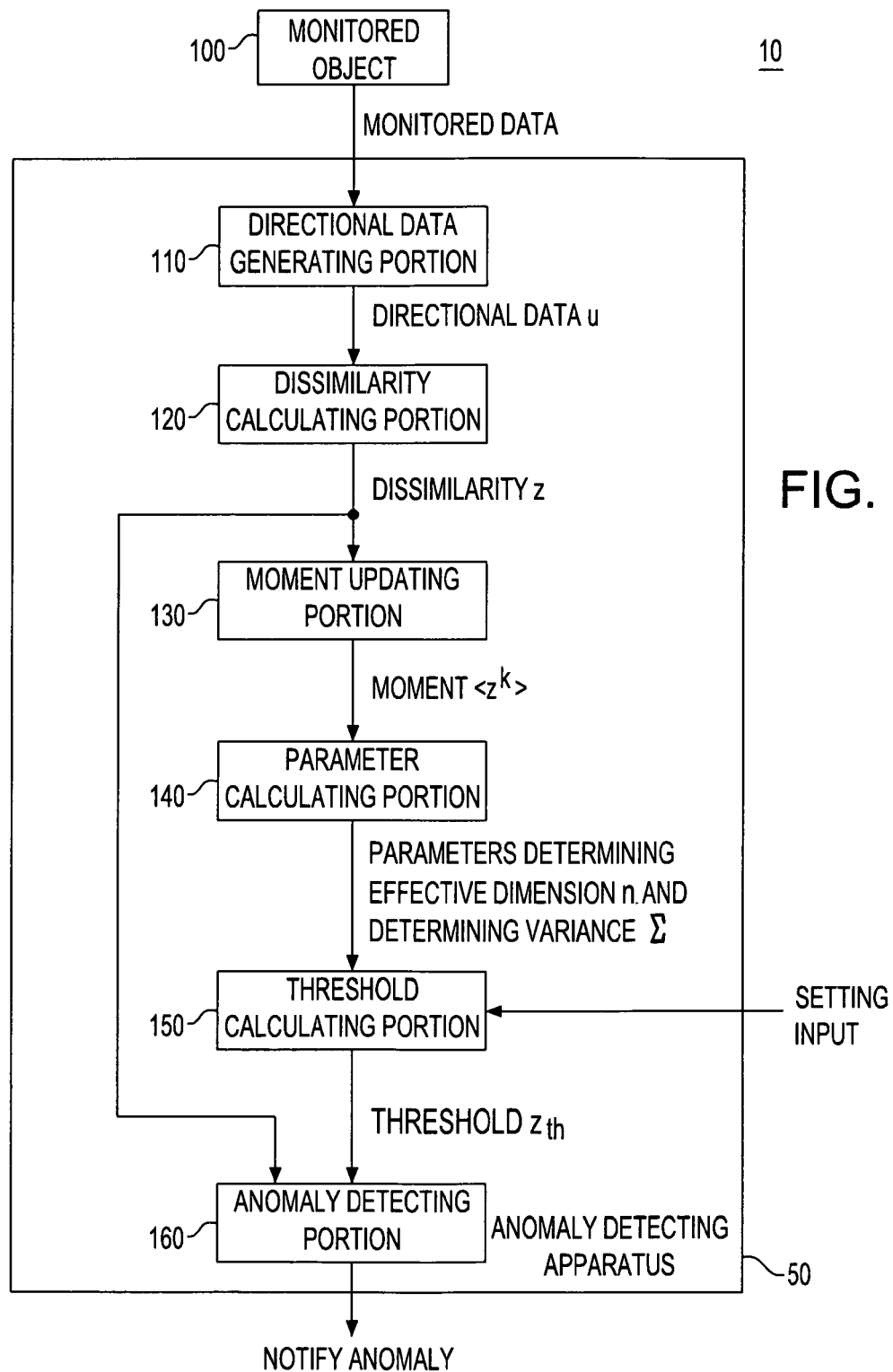
FIG. 1 shows a configuration of a monitoring system 10 according to an embodiment of the present invention.

10 . . . Monitoring system
20 . . . Text classifying system
50 . . . Anomaly detecting apparatus
100 . . . Monitored object
110 . . . Directional data generating portion
120 . . . Dissimilarity calculating portion
130 . . . Moment updating portion
140 . . . Parameter calculating portion
150 . . . Threshold calculating portion
160 . . . Anomaly detecting portion
170 . . . Category input portion
180 . . . Reconfiguration directing portion
300 . . . Text classifying device
310 . . . Classified text data storage
510 . . . Web system
520 . . . Web server
5201 . . . HTTP server program
5202 . . . Web application program
521 . . . Web server
5211 . . . HTTP server program
5212 . . . Web application program
530 . . . Load distribution device
540 . . . Client device
545 . . . Router
550 . . . Database server
900 . . . Measured variable input portion
910 . . . Change rate calculating portion
920 . . . Dependency calculating portion
1900 . . . Computer
2000 . . . CPU
2010 . . . ROM
2020 . . . RAM
2030 . . . Communication interface
2040 . . . Hard disk drive
2050 . . . Flexible-disk drive
2060 . . . CD-ROM drive
2070 . . . Input-Output chip
2075 . . . Graphic controller
2080 . . . Display device
2082 . . . Host controller
2084 . . . Input-Output controller
2090 . . . Flexible disk
2095 . . . CD-ROM

DESCRIPTION OF THE INVENTION

The present invention provides anomaly detecting apparatus, anomaly detecting methods, anomaly detecting programs, and recording medium relating to the anomaly detecting apparatus, which can solve the above problems. The aspect is achieved by a combination of features set forth in the independent claims. The dependent claims define further advantageous specific embodiments of the present invention.

An example embodiment of the anomaly detecting apparatus detects an anomaly in monitored data. The apparatus includes: a directional data generating portion for sequentially generating directional data which are unit vectors indicating a feature of each piece of monitored data correspondingly to the monitored data which are input in sequence; a dissimilarity calculating portion for calculating the dissimilarity of the directional data to a pre-specified reference vector; a moment updating portion for updating a moment of the distribution of the dissimilarity appearing when the directional data is modeled with a multi-dimensional probability distribution, on the basis of the moment already calculated and the dissimilarity of the directional data to a new piece of the monitored data; a parameter calculating portion for calculating a parameter determining the variance of the multi-dimensional probability distribution, on the basis of the moment; a threshold calculating portion for calculating a threshold of the dissimilarity on the basis of the multi-dimensional probability distribution the variance of which is determined by the parameter; and an anomaly detecting portion for detecting an anomaly in the monitored data that corresponds to the dissimilarity if the dissimilarity exceeds the threshold.

It is noted that subcombinations of the features also constitute the present invention. Thus according to the present invention, an anomaly can be properly detected based on directional data sequentially obtained from a monitored aspect. While the present invention will be described below with respect to particular embodiments, the embodiments are not intended to limit the present invention which is defined in the claims and not all of the combinations of features described in the embodiments are essential to the inventive solution.

FIG. 1 shows a configuration of a monitoring system 10 in the present embodiment. The monitoring system 10 includes a monitored object 100 and an anomaly detecting apparatus 50 which monitors the object 100 and detects any anomaly. The monitored object 100 may be a source supplying text data in a text classification problem, a computer system monitored for any anomaly, a vehicle such as automobile, or a system, such as a machine, that operates based on natural phenomena. The anomaly detecting apparatus 50 detects an anomaly in the monitored object 100 by monitoring data (monitored data) obtained from the monitored object 100 to detect an anomaly.

The anomaly detecting apparatus 50 includes a directional data generating portion 110, a dissimilarity calculating portion 120, a moment updating portion 130, a parameter calculating portion 140, a threshold calculating portion 150, and an anomaly detecting portion 160. The directional data generating portion 110 sequentially generates directional data u, which are unit vectors indicating features of monitored data, correspondingly to the monitored data which are sequentially input online. The dissimilarity calculating portion 120 calculates the dissimilarity z of directional data u to a predetermined reference vector r according to Expression (1), for example.

The moment updating portion 130, based on a moment calculated previously and the dissimilarity z of directional data corresponding to the new monitored data 100, updates the moment of the distribution of dissimilarity z appearing when the distribution of directional data u corresponding to pieces of monitored data sequentially input is modeled with a multi-dimensional probability distribution. The parameter calculating portion 140 calculates a parameter that determines the variance of the multi-dimensional probability distribution, on the basis of the moment updated by the moment updating portion 130.

The threshold calculating portion 150 calculates the threshold $z_{th}$ of the dissimilarity z on the basis of the multi-dimensional probability distribution having the variance determined by the parameter. If the dissimilarity z exceeds the threshold $z_{th}$, the anomaly detecting portion 160 detects an anomaly in the monitored data that corresponds to that dissimilarity z.

Figure 2:
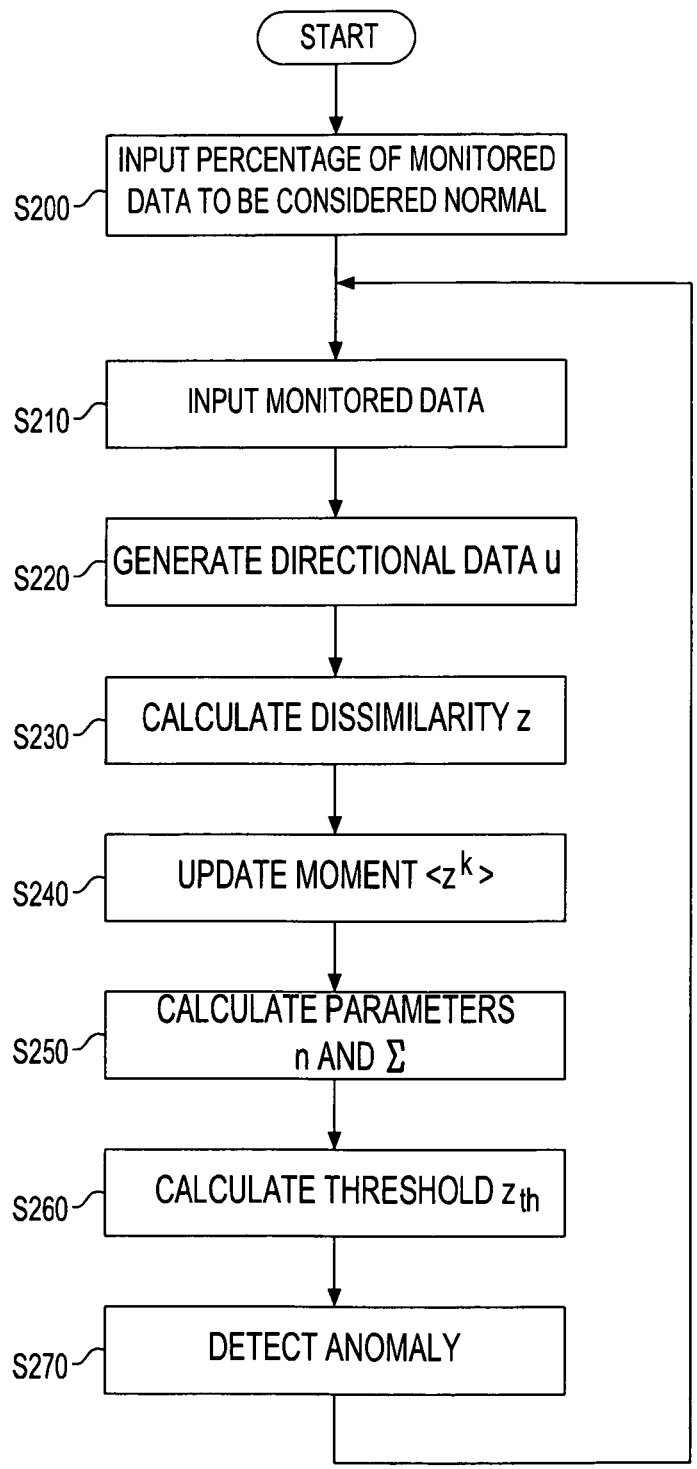
FIG. 2 shows an operation flow in the monitoring system 10 according to the embodiment of the present invention.

FIG. 2 shows an operation flow in the monitoring system 10 in the present embodiment. First, the percentage $p_c$ of monitored data to be considered normal is input into the threshold calculating portion 150 (S200). The percentage $p_c$ gives the boundary of the critical region of monitored data that should be considered abnormal among all monitored data. Then, monitored data are sequentially input into the directional data generating portion 110 (S210). The monitored data may be text data in a text classification problem, data concerning transactions exchanged between programs in a predetermined period of time in anomaly detection in a computer system, or measured parameter values obtained from various sensors in anomaly detection in a vehicle or a machine.

The directional data generating portion 110 then generates directional data u, which are unit vectors indicating features of the monitored data in sequence correspondingly to the input monitored data (S220) For a text classification problem, for example, the directional data generating portion 110 generates text vector based on the occurrence frequency of each word in input text data and normalizes it to generate directional data u.

Then, the dissimilarity calculating portion 120 calculates the dissimilarity z of the directional data u to the reference vector r (S230). The dissimilarity calculating portion 120 in the present embodiment calculates the dissimilarity z by subtracting the inner products of the reference vector r and the directional data u from 1, as shown in Expression (1).

Then, the moment updating portion 130 updates the moment of the distribution of the dissimilarity z appearing when the directional data u is modeled with a multi-dimensional probability distribution, according to a moment calculated previously and the dissimilarity of the directional data corresponding to new monitored data (S240). The moment is used by the parameter calculating portion 140 for updating the model of the multi-dimensional probability distribution of the directional data u. Then, the parameter calculating portion 140 calculates a parameter that determines the variance of the multi-dimensional probability distribution, on the basis of the moment updated by the moment updating portion 130 (S250). In addition, the parameter calculating portion 140 may calculate a parameter that determines the effective dimension of the multi-dimensional probability distribution, on the basis of the parameter updated by the moment updating portion 130.

The anomaly detecting apparatus 50 according to the present embodiment uses the von Mises-Fisher distribution (Expression (2)), which is one example of the multi-dimensional probability distribution, to model the directional data u, with the aim of properly modeling the distribution of the directional data u.

If the directional data u is modeled with the von Mises-Fisher distribution, which is one example of the multi-dimensional probability distribution, the distribution function q(z) of the dissimilarity z can be obtained in the following way:

First, the directional data u, which is a random variable, is converted into N-dimensional spherical coordinates. Here, the area element $d^{N-1}\Omega$ on the N-dimensional sphere can be expressed as Expression (3) by using angular variables $(\theta, \theta_2, \ldots, \theta_{N-1})$, where the polar axis is along the direction of the reference vector r and the angle between the polar axis and the directional vector u is defined as $\theta$.

[Expression 3]

$$d^{N-1}\Omega = d\theta d\theta_2 \ldots d\theta_{N-1} \sin^{N-2}\theta \sin^{N-3}\theta_2 \ldots \sin\theta_{N-2} \quad (3)$$

By using this expression, the distribution function $p(\theta)$ with the parameter $\theta$ for the dissimilarity z can be expressed as the marginal distribution of the von Mises-Fisher distribution, as in Expression (4).

[Expression 4]

$$p(\theta) = \int \ldots \int d\theta_2 \ldots d\theta_{N-1} \sin^{N-2}\theta \sin^{N-3}\theta_2 \ldots \sin\theta_{N-2} f(u \mid r, \Sigma) \quad (4)$$

Considering the state where the directional data u generally concentrates in the vicinity of a reference vector r, the approximation shown in Expression (5) can be used.

[Expression 5]

$$\sin^{N-2}\theta \approx \theta^{N-2}, z \approx \frac{\theta^2}{2} \quad (5)$$

By using the approximation shown in Expression (5) and transforming the variable $\theta$ to z, the distribution function q(z) of the dissimilarity z shown in Expression (6) can be obtained from Expression (4).

[Expression 6]

$$q(z) = \frac{1}{\Gamma((N-1)/2)} \left(\frac{z}{2\Sigma}\right)^{\frac{N-1}{2}} \exp\left[-\frac{z}{2\Sigma}\right] \frac{1}{z} \quad (6)$$

Here, $\Sigma/2$ has been changed to $\Sigma$ in the course of driving Expression (6).

In the foregoing, it has been implicitly assumed that the degrees of freedom of the directional data u vary equally. Typical directional data does not necessarily meet this assumption, but the components are generally homogenized by transformation called tf-idf (see Non-Patent Document 2) for text vectors, or by a logarithmic transformation, which will be described later, for anomaly detection in a computer system.

However, in general, inhomogeneity of the degrees of freedom may remain after these transformations and relatively inactive degrees of freedom may exist. Therefore, in the anomaly detecting apparatus 50 according to the present embodiment, an effective dimension n which is the effective dimension excluding inactive degrees of freedom in the distribution of the directional data u is introduced in place of the dimension N of the reference vector and the directional data and the distribution of the dissimilarity z is represented by Expression (7).

[Expression 7]

$$q(z) = \frac{1}{\Gamma((n-1)/2)} \left(\frac{z}{2\Sigma}\right)^{\frac{n-1}{2}} \exp\left[-\frac{z}{2\Sigma}\right] \frac{1}{z} \quad (7)$$

Here, z denotes the dissimilarity, $\Gamma(\ )$ denotes the gamma function, n denotes the parameter that determines the effective dimension of the von Mises-Fisher distribution, and $\Sigma$ denotes the parameter that determines the variance of the von Mises-Fisher distribution.

By introducing the effective dimension n, the effect of the inhomogeneity of the degrees of freedom in the directional data u can be absorbed sufficiently for practical applications. Moreover, the directional data u can be modeled more adequately by updating the parameter n of the effective dimension successively in accordance with the directional data u obtained from monitored data which are input sequentially.

Expression (7) indicates that the distribution of the dissimilarity z is approximated to a chi-square distribution if the distribution of the directional data u is modeled with the von Mises-Fisher distribution.

At step S250, the parameter calculating portion 140 calculates the parameter n that determines the effective dimension of the von Mises-Fisher distribution and the parameter $\Sigma$ that determines the variance included in Expression (7) to define the von Mises-Fisher distribution for the directional data u. Here, if a maximum likelihood equation is formulated in a typical way in order to perform the online maximum likelihood estimation of the two parameters n and $\Sigma$, an unknown n as a gamma function would be included in the equation and therefore the equation would be unsolvable.

While one may think of approximating the gamma function with the Stirling's formula, the validity of the approximation is not ensured. Furthermore, the maximum likelihood equation itself cannot be solved analytically after the approximation with the Stirling's formula and an additional approximation or mathematical operations would be required.

Therefore, the anomaly detecting apparatus 50 according to the present embodiment uses a nature of the chi-square distribution to obtain the parameter n of the effective dimension and the parameter $\Sigma$ of the variance, rather than directly solving a maximum likelihood equation. It is known that, in the chi-square distribution, the first moment $<z>$ and second moment $<z^2>$ can be analytically obtained according to Expression (8).

[Expression 8]

$$<z>=(n-1)\Sigma, <z^2>=(n^2-1)\Sigma^2 \quad (8)$$

The angle brackets represent the average obtained with the probability distribution q(z) ($<z>=\int q(z)*z\, dz$, $<z^2>=\int q(z)*z^2\, dz$).

Here, the moment updating portion 130 can calculate a new moment based on the k-th moment already calculated and the dissimilarity of the directional data u corresponding to new monitored data according to Expression (9).

[Expression 9]

$$<z^k>^{(t)} = (1-\beta)<z^k>^{(t-1)} + \beta z(t)^k \quad (9)$$

Here, $<z^k>^{(t)}$ denotes the k-th moment to be newly calculated at time t, $<z^k>^{(t-1)}$ denotes the k-th moment already calculated at time t−1, z(t) denotes the dissimilarity of the directional data corresponding to new monitored data at time t, and $\beta$ denotes the forgetting factor. The forgetting factor is a positive value less than or equal to 1 and typically is the inverse of the number of samples of the dissimilarity z during the period in which the average is calculated.

The moment updating portion 130 in the present embodiment calculates the first and second moments of the distribution of the dissimilarity z by using Expression (10).

[Expression 10]

$$<z>^{(t)} = (1-\beta)<z>^{(t-1)} + \beta z(t),$$
$$<z^2>^{(t)} = (1-\beta)<z^2>^{(t-1)} + \beta z(t)^2 \qquad (10)$$

The parameter calculating portion 140 calculates the parameter n that determines the effective dimension of the von Mises-Fisher distribution and the parameter $\Sigma$ that determines the variance on the basis of the moments updated by the moment updating portion 130. Here, Expression (11) can be derived from Expression (8).

[Expression 11]

$$n-1 = \frac{2\langle z\rangle^2}{\langle z^2\rangle - \langle z\rangle^2}, \quad \sum = \frac{\langle z^2\rangle - \langle z\rangle^2}{2\langle z\rangle} \qquad (11)$$

The parameter calculating portion 140 in the present embodiment calculates the parameter n that determines the effective dimension of the von Mises-Fisher distribution and the parameter $\Sigma$ that determines the variance by using Expression (11) on the basis of the first and second moments $<z>$ and $<z^2>$ of the distribution of the dissimilarity z that have been calculated by the moment updating portion 130 by using Expression (10).

After steps S240 and S250 described above, the threshold calculating portion 150 calculates the threshold $z_{th}$ of the dissimilarity z on the basis of the von Mises-Fisher distribution the effective dimension and the variance of which have been calculated by the parameter calculating portion 140 (S260). More specifically, the threshold calculating portion 150 calculates the threshold $z_{th}$ that satisfies Expression (12), so that the accumulation of the probabilities that the dissimilarity z in the distribution q(z) of the dissimilarity z, which corresponds to the von Mises-Fisher distribution, is less than or equal to the threshold $z_{th}$ becomes equal to the percentage $p_c$ input at S200.

[Expression 12]

$$\int_0^{z_{th}} dz q(z) = 1 - P_c \qquad (12)$$

If the dissimilarity z calculated at S230 exceeds the threshold $z_{th}$ calculated by the threshold calculating portion 150 ($z > z_{th}$), then the anomaly detecting portion 160 detects an anomaly in the monitored data which corresponds to that dissimilarity z (S270). Thus, the anomaly detecting portion 160 can detect an anomaly in the monitored object 100.

The anomaly detecting apparatus 50 performs the process from S210 to S270 described above every time monitored data is input online in sequence. Thus, the anomaly detecting apparatus 50 can properly determine whether there is any anomaly in the monitored data by updating the thresholding condition in sequence online according to the directional data u obtained in sequence.

In the process described above, the directional data u provided in time series may be preprocessed by the directional data generating portion 110 in order to prevent an extreme difference between the value ranges of components from occurring. For the preprocessing, a logarithmic transformation, which will be described later, can be used in a preferable manner. Furthermore, the tf-idf method can be used in the preprocessing for a problem such as a text classification problem.

As has been described above, with the anomaly detecting apparatus 50, the threshold z for detecting an anomaly or determining whether or not data belongs to a category can be decided from universal values independent of the multi-dimensional probability distribution or the distribution of the dissimilarity z on the basis of the percentage $p_c$ for the critical region. For example, if a reference vector is specified for each of a number of categories in a text classification problem and directional data is classified into any of the categories according to the dissimilarity to the reference vector, the anomaly detecting apparatus 50 can input the same percentage $p_c$ for all categories and calculates each threshold $z_{th}$ used for classifying the data into each category based on the percentage $p_c$. Thus, the anomaly detecting apparatus 50 can set appropriate the thresholding condition without the need for the user to determine criteria for each individual category.

While the multi-dimensional probability distribution is the von Mises-Fisher distribution in the example described above, the multi-dimensional probability distribution may be any other distribution such as a multi-dimensional normal distribution, instead of the von Mises-Fisher distribution. If a multi-dimensional normal distribution is used, the dissimilarity calculating portion 120 calculates the dissimilarity z based on Mahalanobis' generalized distance at step S230. Thereby the dissimilarity calculating portion 120 can transform the distribution of the dissimilarity z to the chi-square distribution. Consequently, the anomaly detecting apparatus 50 can perform the process at step S240 and the subsequent steps in the case of the von Mises-Fisher distribution.

Figure 3:
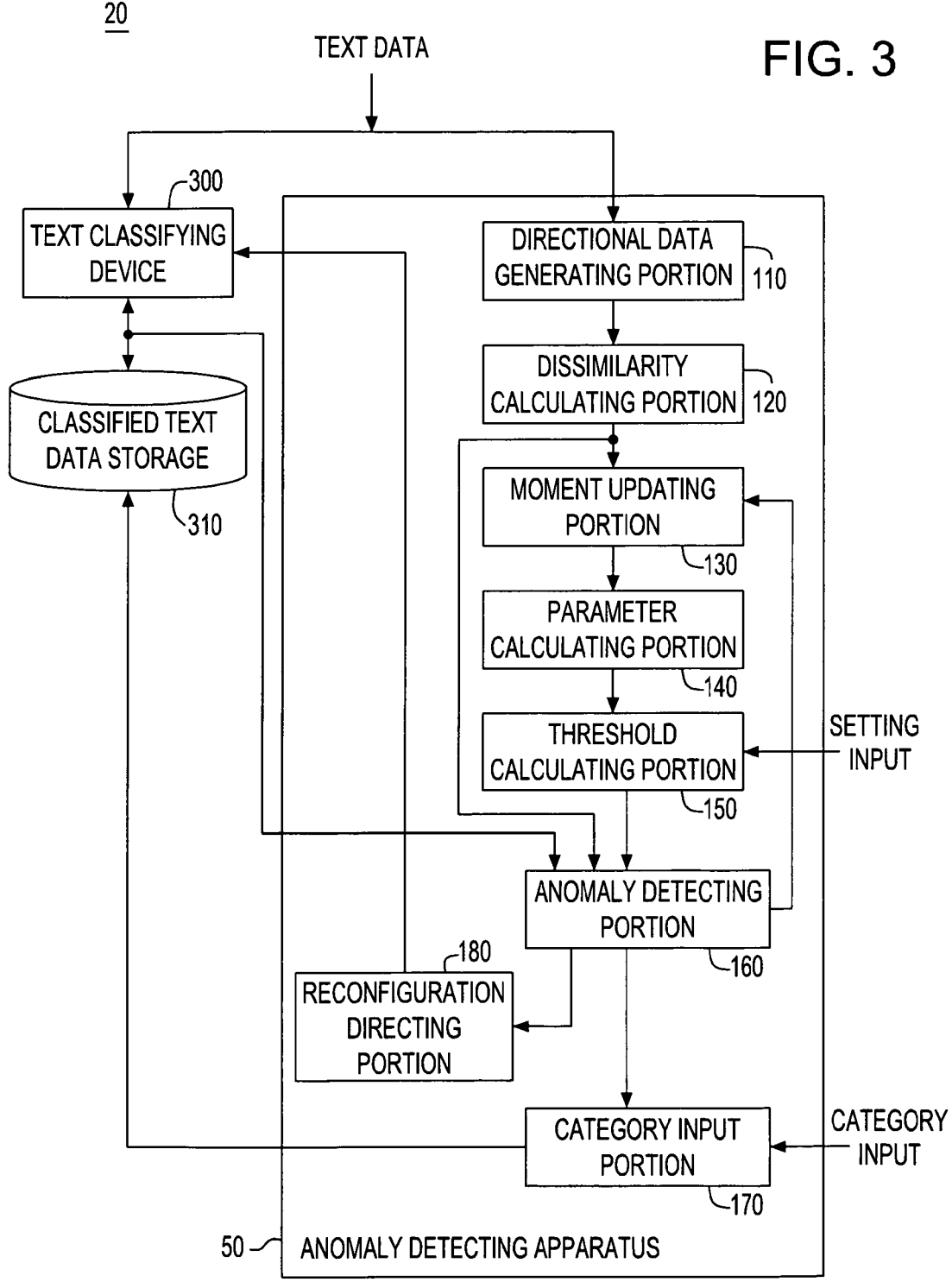
FIG. 3 shows a configuration of a text classifying system 20 according to a first variation of the embodiment of the present invention.

FIG. 3 shows a configuration of a text classifying system 20 in a first variation of the present embodiment. The text classifying system 20 includes a text classifying device 300, a classified text data storage 310, and anomaly detecting apparatus 50. The anomaly detecting apparatus 50 in the present embodiment is intended to determine whether or not classification of text data by the text classifying device 300 is proper.

The text classifying device 300 classifies text data sequentially input into a particular category. If there is more than one category, the text classifying device 300 may classify the text data as any of the categories or may classify the text data as belonging to none of the categories. The classified text data storage 310 stores the text data classified by the text classifying device 300. The anomaly detecting apparatus 50 is used as a text classification evaluating apparatus that evaluates whether classification of text data by the text classifying device 300 is proper or not, and detects an anomaly in text classification by the text classifying device 300.

The anomaly detecting apparatus 50 includes a directional data generating portion 110, a dissimilarity calculating portion 120, an anomaly detecting portion 160, a moment updating portion 130, a parameter calculating portion 140, a threshold calculating portion 150, a category input portion 170, and a reconfiguration directing portion 180. In FIG. 3, the components labeled with the same reference numerals as those in FIG. 1 have substantially the same functions and configuration as those components in FIG. 1 and therefore the description of which will be omitted in the following description, except for differences.

The directional data generating portion 110 generates directional data indicating features of text data in sequence correspondingly to the text data input in sequence. The dissimilarity calculating portion 120 calculates the dissimilarity of the directional data to a reference vector specified in association with each category. If the dissimilarity for text data classified into a particular category by the text classifying device 300 exceeds a threshold, the anomaly detecting portion 160 detects an anomaly in the classification by the text classifying device 300.

If text data is classified into any of the categories and the dissimilarity does not exceed the threshold, the moment updating portion 130 updates the moment of the distribution of dissimilarity appearing when the directional data are modeled by using the multi-dimensional probability distribution corresponding to that category. The parameter calculating portion 140 calculates the moment that determines the variance of the multi-dimensional probability distribution corresponding to the category, on the basis of the moment updated by the moment updating portion 130. In addition, the parameter calculating portion 140 may calculate the parameter that determines the effective dimension of the multi-dimensional probability distribution. The threshold calculating portion 150 calculates the threshold of the dissimilarity corresponding to the categories, on the basis of the multi-dimensional probability distribution the variance and/or effective dimension of which has been determined by the parameter(s) calculated by the parameter calculating portion 140.

If an anomaly of the text classifying device 300 is detected, an instruction instructing whether to classify the text data as any of the categories or not is input into the category input portion 170 by a user. If the anomalies in the text classifying device 300 have been detected with a frequency higher than or equal to a predetermined frequency, the reconfiguration directing portion 180 directs the text classification device 300 to reconfigure it so as to properly classify the pieces of text data classified by the user. In response to this direction, the text classifying device 300 reconfigures its classification function by using the classified text data stored in the classified text data storage 310.

Figure 4:
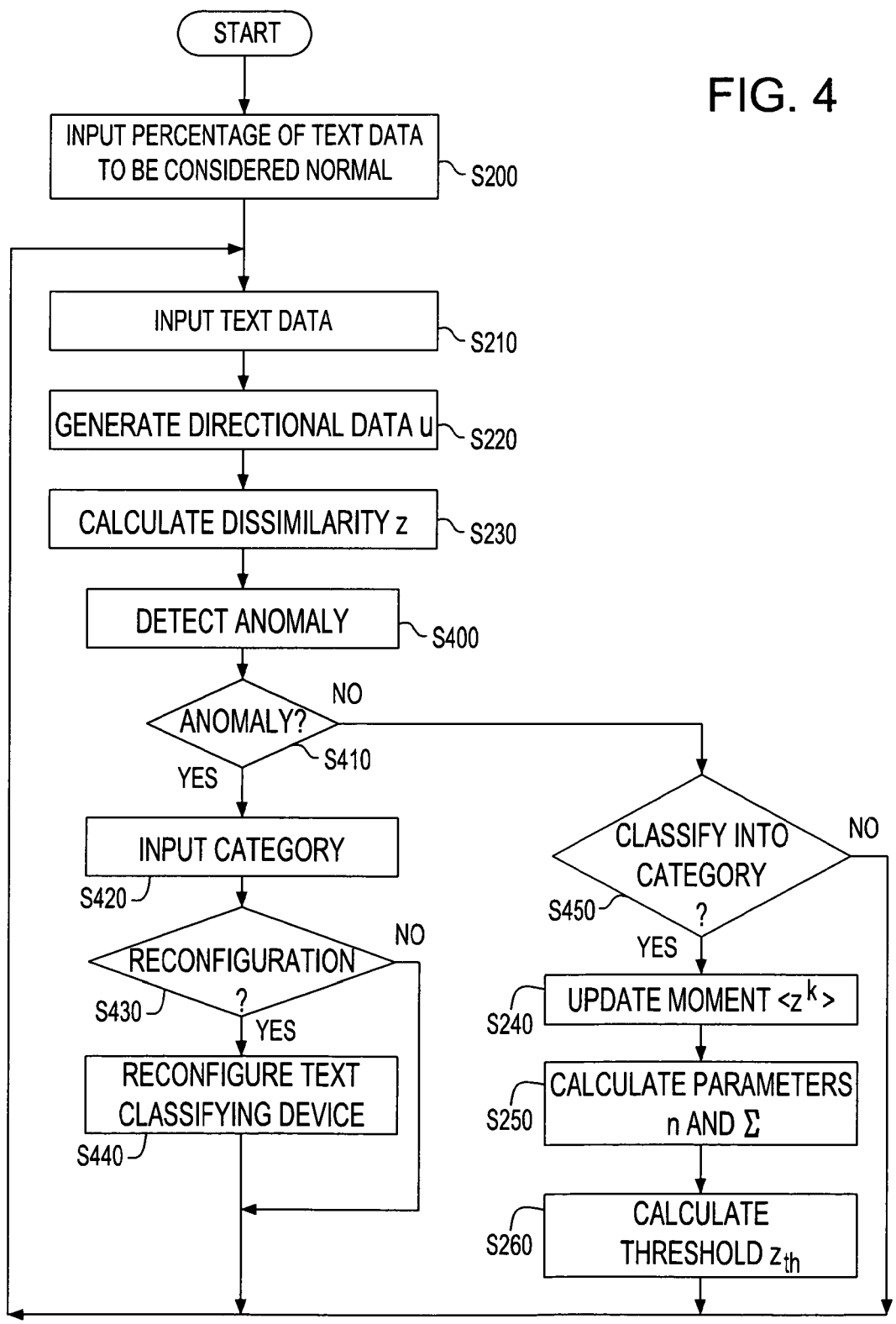
FIG. 4 shows an operation flow in the text classifying system 20 according to the first variation of the embodiment of the present invention.

FIG. 4 shows an operation flow in the anomaly detecting apparatus 50 according to the first variation of the present embodiment. Prior to the process in the operation flow, the text classifying system 20 is initialized. That is, the text classifying device 300 sets its classification function according to data categorized beforehand. The anomaly detecting apparatus 50 sets the initial value of a threshold $z_{th}(C_i)$ for each of a plurality of categories $C_i$.

When the operation flow is started, the percentage $p_c$ of monitored data to be considered normal is input into the threshold calculating portion 150 as in S200 in FIG. 2 (S200). Then, text data, which are monitored data, are input into the directional data generating portion 110 in sequence as in S210 in FIG. 2 (S210). The text data are concurrently input into the text classifying device 300, which classifies the text data into any of a number of categories.

Here, the text classifying device 300 may use the Naive Bayes method (see Non-Patent Document 7), the Support vector machines (see Non-Patent Document 8), or a Stochastic Decision list (see Non-Patent Document 9), for example, to classify the text data. In the Naive Bayes method, for example, if the categories are $C_1, \ldots, C_n$, the text classifying device 300 calculates, for the input text vector ($d_j$) the posterior probability $P(C_i|d_j)$ that the text data falls in each category and classifies the text data into the category that provides the highest probability.

Then, the directional data generating portion 110 generates directional data u, which is a unit vector indicating a feature of each piece of input text data in sequence as in S210 in FIG. 2 (S220). Here, the directional data generating portion 110 generates text vectors from the text data by using the tf-idf method or a similar method and normalizes the text vectors to generate the directional data u. Because the text vectors are high-dimensional text vectors with thousands to tens of thousands of dimensions, the directional data generating portion 110 may reduce the dimension to 200 or so by using the Latent Semantic Indexing method (see Non-Patent Document 6).

Then, the dissimilarity calculating portion 120 calculates the dissimilarity of the directional data u to a reference vector r corresponding to each of the categories as in S230 in FIG. 2 (S230).

If the text classifying device 300 has classified the text data into any of the categories, the anomaly detecting portion 160 inputs the category $C_k$ into which the text data has been classified. Then, anomaly detecting portion 160 determines whether or not the classification of the text data into that category is appropriate to detect an anomaly of the text classifying device 300 (S400). More specifically, if the dissimilarity z of the text data classified into the category $C_k$ to that category exceeds the dissimilarity threshold $z_{th}(C_k)$ for that category, an anomaly of the text classifying device 300 is detected by the anomaly detecting portion 160.

If an anomaly of the text classifying device 300 has been detected at S400, a category for the text data is input by a user through the category input portion 170 (S420). Alternatively, the category input portion 170 may function as a category generating portion that generates a new category into which the text data is to be classified.

If the anomalies in the text classifying device 300 have been detected with a frequency higher than or equal to the predetermined frequency (S430: Yes), then the reconfiguration directing portion 180 directs the text classifying device 300 to reconfigure it (S440). In response to this, the text classifying device 300 reconfigures its classification function. Here, if the number of anomalies of the text classifying device 300 detected reaches a predetermined number, the reconfiguration directing portion 180 directs the text classifying device 300 to reconfigure it to set the frequency. In that case, the reconfiguration directing portion 180 may set the number equivalent to 5% of the number of pieces of text data input into a given time period such as three months as the frequency.

On the other hand, if the text data is classified into any of the categories (S450: Yes) and the dissimilarity z does not exceed the threshold $z_{th}(C_k)$ (S410; No), the moment updating portion 130 updates the moment of the distribution of dissimilarity z appearing when the directional data u is modeled by using the multi-dimensional probability distribution corresponding to the category, as in S240 in FIG. 2 (S240). Then, the parameter calculating portion 140 calculates the parameter that determines the variance and/or the effective dimension of the multi-dimensional probability distribution corresponding to the category on the basis of the moment updated by the moment updating portion 130, as in S250 in FIG. 2 (S250). Then, the threshold calculating portion 150 calculates the threshold $z_{th}(C_k)$ of dissimilarity z for the category $C_k$ based on the multi-dimensional probability distribution determined from the parameter calculated by the parameter calculating portion 140 and provides it to the anomaly detecting portion 160.

In the text classifying system 20 described above, the anomaly detecting apparatus 50 updates the threshold $z_{th}$ according to text data sequentially input online to update the thresholding condition according to the text data. If the frequency of anomalies detected is higher than or equal to a predetermined frequency, the anomaly detecting apparatus 50 can direct the text classifying device 300 to reconfigure it to adjust the classification function of the text classifying device 300, whereby text classifying system 20 can use the text classifying device 300 using any of the text classification methods recently proposed. Furthermore, the text classifying device 300 using a text classification method that is difficult to update online due to a large amount of processing required for reconfiguration can be properly reconfigured by the anomaly detecting apparatus 50 directing the text classifying device 300 to reconfigure at a proper timing.

Figure 5:
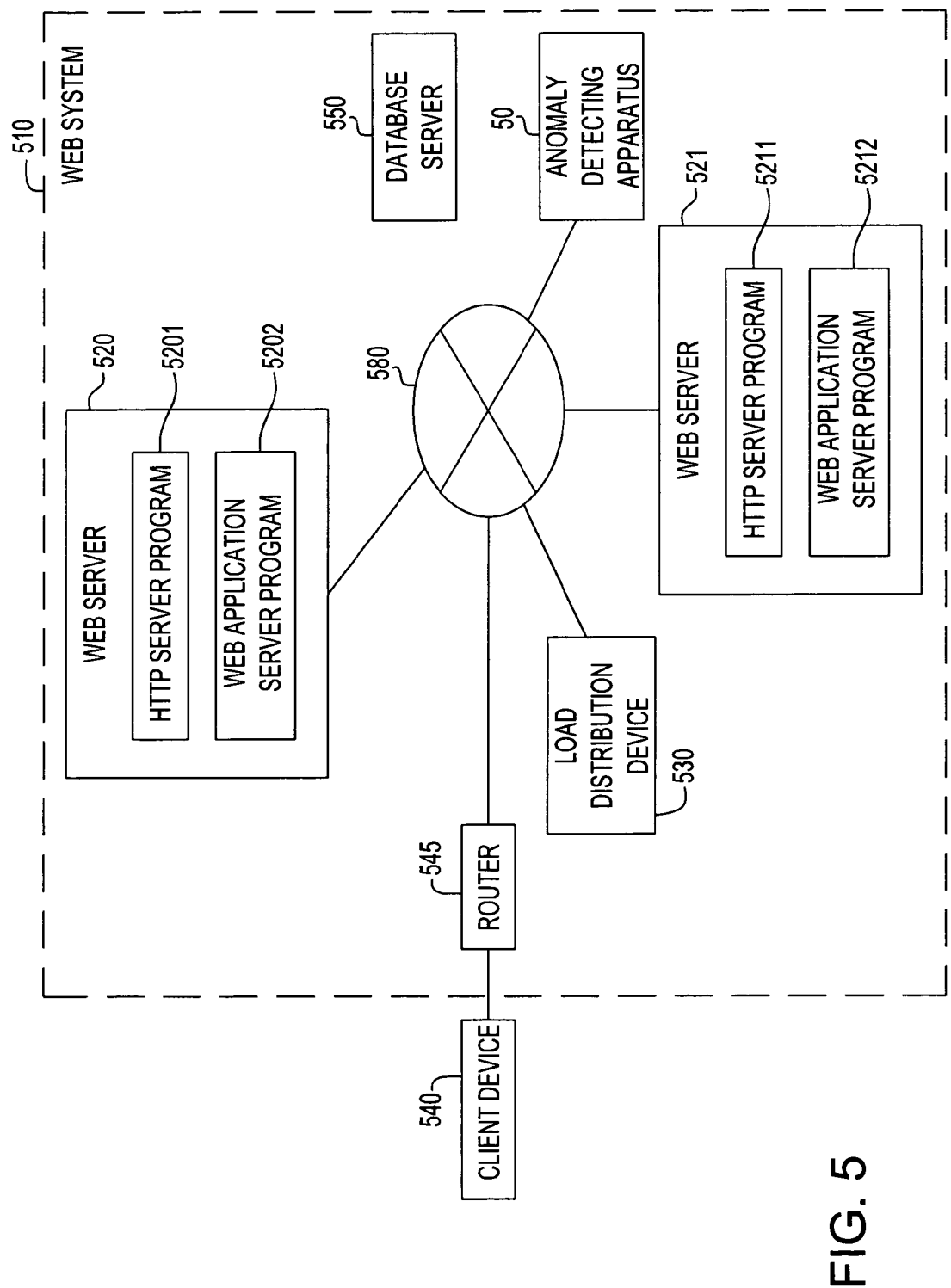
FIG. 5 shows a configuration of a web system 510 according to a second variation of the embodiment of the present invention.

FIG. 5 shows a configuration of a web system 510 in a second variation of the present embodiment. The web system 510 in the present embodiment, which is an example of an information processing system according to the present invention, includes a router 545 routing network connections from a client device 540, redundant web servers 520, 521, a database server 550, a load distribution device 530 which determines the access target of the redundant web servers 520, 521, an anomaly detecting apparatus 50, and a public line network 580.

The web servers 520, 521 are an example of an information processing apparatus according to the present invention and run HTTP server programs 5201, 5211, and web application server programs 5202, 5212. For example, the web servers 520, 521 may store data input from the client device 540 into the database server 550 or may return data obtained from the database server 550 to the client device 540.

The anomaly detecting apparatus 50 detects any anomaly in the information processing system including a number of information processing apparatuses. That is, the anomaly detecting apparatus 50 obtains feature vectors indicating behaviors at the application layer of the web system 510 online and detects an anomaly in directional data u of the feature vectors to detect an anomaly in the web system 510. The anomaly detecting apparatus 50 according to the present variation has substantially the same functions and configuration as those of the anomaly detecting apparatus 50 shown in FIG. 1 and therefore the description of which will be omitted except for differences.

While the client device 540, the web servers 520, 521, database servers 550, and other components are interconnected through the public line network 580 in the above configuration, they may be interconnected without using the public line network 580 or the Internet may be used in place of the public line network 580. The types of servers and programs running on the servers given above are illustrative, but not limitative.

Figure 6:
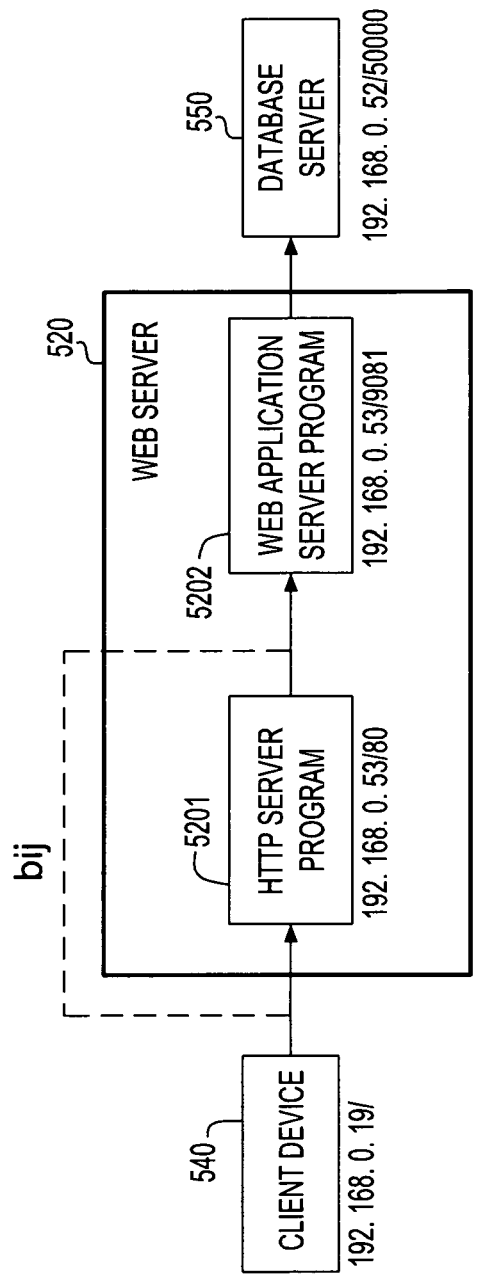
FIG. 6 shows relations among a client device 540, servers, and programs according to the second variation of the embodiment of the present invention.

FIG. 6 shows relations among the client device 540, servers, and programs in the second variation of the present embodiment. FIG. 6 is a conceptual diagram of a web system consisting of the client device 540, web server 520, and database server 550. An HTTP server program 5201 and a web application server program 5202 are executed on the web server 520. The IP addresses and port numbers of the client device 540 and the servers are shown below the nodes. The IP addresses, the port numbers, the nodes, and relation between the nodes will be described below.

Taking notice of correlation or degree of association between vertexes of the network in the computer system, the degree of association between nodes in the system in runtime is considered. Herein, the term "node" means a unit monitored for a fault, which can be designated by a certain IP address, for example. If two programs are running on one web server as shown in FIG. 5, an application designated by (IP address, port number) may be considered as a node. A "service" is taken as an example herein. The term "service" means processing of a server program to generate data necessary for another server program. Namely, the correlation between nodes is considered as "service", i.e. the binomial relation of (requesting-side IP address, requested-side IP address, requested-side port number). Moreover, the number of times that i gives rise to j at a certain time is a weight between service i and service j.

In FIG. 6, (192.168.0.19, 192.168.0.53, 80) is an example of the service. Generally, service correlation can be represented by a matrix.

This is called a service correlation matrix and formally expressed as Expression (13-1).

[Expression 13]

$$s_{ijk} = (I_i, I_j, p_k) \tag{13-1}$$

$$s_{ijkl} = (I_i, I_j, p_k, t_l) \tag{13-2}$$

Here, I denotes the IP address, the requesting-side IP address is an i element, the requested-side IP address is a j element, and p denotes the requested-side port number. In addition to the requesting-side IP address, requested-side IP address, and requested-side port number, a requested-side transaction type may be considered. In that case, the service correlation matrix is represented by Expression (13-2), where t denotes the requested-side transaction type.

The elements of the correlation matrix in (13-1) are represented as Expression (14).

[Expression 14]

$$b(s_{imn}, s_{ijk}) \tag{14}$$

Here, B(t) is expressed as Expression (15).
[Expression 15]

$$B(t) = \begin{pmatrix} b_{11} & b_{12} & \dots & b_{1n} \\ b_{21} & b_{22} & \dots & b_{2n} \\ \vdots & \vdots & \ddots & \vdots \\ b_{n1} & b_{n2} & \dots & b_{nn} \end{pmatrix} \tag{15}$$

[Expression 16]

$$a_{ijk} = \sum_s b(s, s_{ijk}) \tag{16}$$

Considering a quantity given by Expression (16), this is interpreted to represent the occurrence frequency of service $s_{ijk} = (I_i, I_j, p_k)$.

If the port number is contracted, a matrix representing the communication relation between the IP addresses can be extracted. That is, the matrix is represented by Expression (17).
[Expression 17]

$$c_{ij} = \sum_{p_k} a_{ijk} \tag{17}$$

Alternatively, if the IP address of the parent service is contracted, the service correlation matrix may be represented by Expression (18).

[Expression 18]

$$d_{jk,lm} = \sum_{l_i} b(s_{ijk}, s_{klm}) \quad (18)$$

In this way, the degree of association between the applications ($I_i$, $P_k$) and ($I_l$, $p_m$) can be extracted. In the following description, the term "node" is used as an abstract concept representing the service or the host receiving the service, and the correlation matrix of nodes (hereinafter referred to as a "node correlation matrix") is represented by B.

In the foregoing description, the correlation between nodes is grasped as the binominal relation (requesting-side IP address, requested-side IP address, requested-side port number) of the service. However, the requesting-side port number may be included, or a MAC address other than the IP address and the port number may be used as another element. The transaction type at a specific port number may be included. Also, the IP address may be an IP version 6 address.

In the present invention, it is often effective to apply some preprocessing to matrix B. Especially, it is effective to transform the matrix element $f_{ij}$ into a monotonic function f in Expression (19) in order to restrict the value range.

[Expression 19]

$$b_{ij} \rightarrow f(b_{ij}) \quad (19)$$

In the web system, it is often effective to use a logarithmic conversion for the function f.

[Expression 20]

$$f(b_{ij}) = \log(1 + b_{ij}) \quad (20)$$

Here, the matrix elements are converted in accordance with the above expression. Other functions such as hyperbolic tangent tan h may be used for preprocessing of the matrix. Alternatively, nominalization for normalizing the row or column sum to 1 may be used, instead of the transformation with f. The essence of the invention is not lost by selecting them.

If any fault occurs in the system during the execution, a change in the node correlation matrix appears. However, it is difficult to detect the fault from that change by viewing each element individually. Because the extensive observed quantity such as the frequency of calls is greatly fluctuated over time, it is difficult to determine whether a change is a fault or simple change in traffic, even if the change is large.

Therefore, extracting a quantity that indicates a change in the entire system is considered. The node correlation matrix given at a certain time represents the degree of association between nodes near that time. The term "degree of association" herein has a meaning corresponding to the transition strength or transition speed from one node to another. Thus, for this matrix, an equation of motion given in Expression (21) similar to Kolmogorov's equation in the Marcov process theory is assumed.

[Expression 21]

$$\frac{du}{dt} \propto Bu \quad (21)$$

Although the node correlation matrix B depends on time for which observation is performed, B is supposed to be a constant in Expression (21) so that the dynamics in a certain time slot is taken into account.

Here, u is a state vector, which is represented by Expression (22).

[Expression 22]

$$u = \begin{pmatrix} u_1 \\ u_2 \\ \vdots \\ u_n \end{pmatrix} \quad (22)$$

In accordance with the equation of motion in Expression (21), the elements of the state vector can be construed as the weights indicating at which node the processing is being performed when the system is observed at a certain time.

Moreover, it is natural to consider that a steady state of the equation of motion in Expression (21) directly reflects the features of the system including the degree of association between the nodes. The node correlation matrix is assumed to be a nonnegative matrix, and the eigenvalue having the maximum absolute value is a real number and isolated, according to the Perron-Frobenius theorem. Also, all the elements of the eigenvector are positive. That is, the feature quantities of the node correlation matrix can be considered to be the solution to the eigenequation.

[Expression 23]

$$Bu = \lambda u, \text{ where } |u| = 1 \quad (23)$$

Alternatively, the feature quantities of the node correlation matrix may be equivalently considered to be the solution to the extremum equation.

[Expression 24]

$$u_1 = \underset{\overline{u}}{\operatorname{argmax}}(u^T B \overline{u}) \text{ subject to } |u|^2 = 1 \quad (24)$$

Noting that B is a nonnegative matrix, the maximization in Expression (22) is clearly attained if the weight of $u_1$ is large when the matrix elements are large. That is, if node i calls another node very positively, the feature quantity has a large weight at node i. In this meaning, the feature quantity is called an activity vector.

Each of the information processing apparatuses in the web system 510 inputs as monitored data a transaction to be transmitted in order to request processing of a service provided by another information processing apparatus, into the directional data generating portion 110 in the anomaly detecting apparatus 50 according to the present variation. Then, the activity vectors described above are calculated from the transactions sent during a predetermined time period to generate directional data u indicating features of those transactions in sequence.

The dissimilarity calculating portion 120 in the anomaly detecting apparatus 50 updates the reference vector r based on a series of directional data u generated by the directional data generating portion 110. The dissimilarity calculating portion 120 then calculates the dissimilarity z of the directional data u to the reference vector r generated based on the series of directional data u input in the past.

As a result of this processing, the dissimilarity z takes a high value when an activity vector that is significantly different from before is calculated. Therefore, if the dissimilarity z exceeds the threshold $z_{th}$, the anomaly detecting portion 160 recognizes that processing that differs from the previous processing is being performed and thus detects an anomaly in the information system.

With the anomaly detecting apparatus 50 described above, an imbalance within the information system can be detected as anomaly by considering the information system as a graph the weight of which dynamically changes and using the directional data u obtained by normalizing the feature vectors extracted from the graph.

Figure 7:
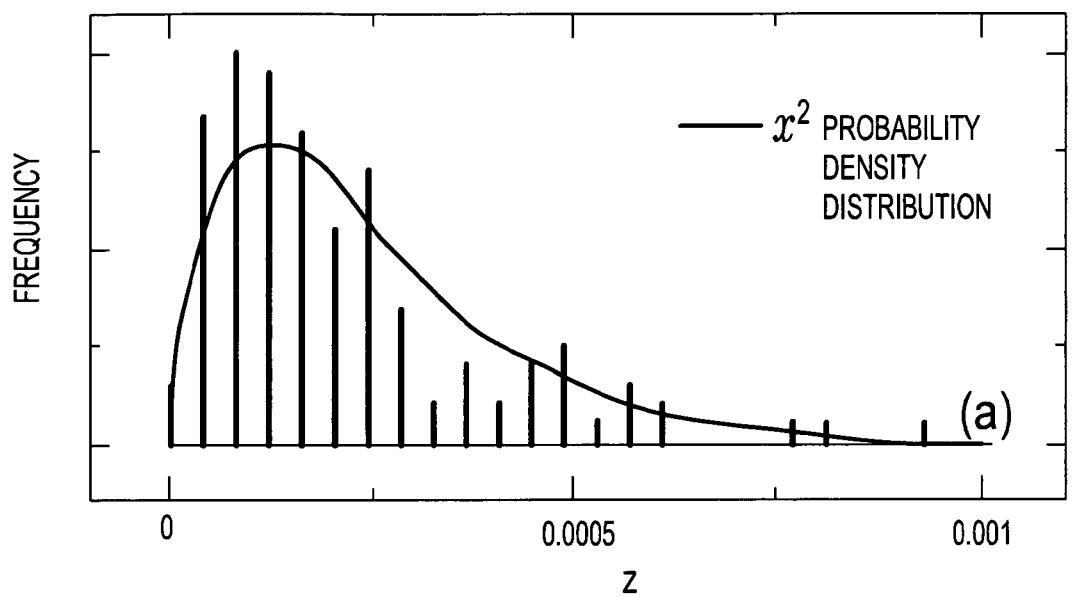
FIG. 7 shows an example of the distribution of dissimilarity z generated from the web system 510 according to the second variation of the embodiment of the present invention.

FIG. 7 shows an example of the distribution of dissimilarity z generated from the web system 510 according to the second variation of the present embodiment. FIG. 7 is a graph produced by calculating time-series data of the dissimilarity z corresponding to time-series data of the directional data u of the activity vector calculated in every determined time slot by using the method described with respect to FIG. 6, and plotting the frequency distribution of the value.

As apparent from FIG. 7, the distribution of the directional data u obtained from the information system is not symmetrical about the average value and it is improper to model the distribution of the dissimilarity z by using the normal distribution. In such a case, it is not practical to calculate the standard deviation of the dissimilarity z and to calculate the threshold $z_{th}$ by using the three-sigma criterion because an error occurs in anomaly detection.

In contrast, with the anomaly detecting apparatus 50 according to the present variation, the directional data u can be properly modeled with the von Mises-Fisher distribution. In that case, the distribution of dissimilarity z is approximated to a chi-square distribution. In FIG. 7, (a) represents the probability density distribution of the dissimilarity z obtained by per-forming the process shown in FIG. 2 on 158 pieces of directional data u obtained in time series. This probability density distribution is obtained by letting β in Expression (10) equal to $\frac{1}{158}$ and substituting the effective dimension parameter n=4.62 and the variance parameter $\Sigma=6.79\times10^{-5}$ obtained by processing at S250 at the last time instant of the measuring period into Expression (7). Here, the effective dimension parameter n was rounded to 5. From FIG. 7, it can be said that the essential features of the distribution of the dissimilarity z of the directional data u in this example can be correctly picked up with the chi-square distribution.

Figure 8:
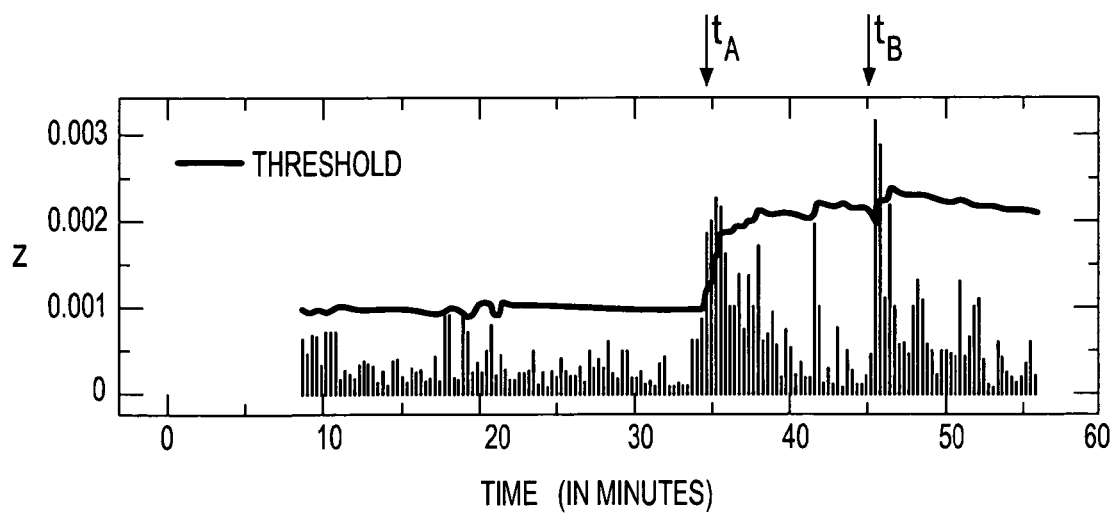
FIG. 8 shows an example of anomaly detection in the web system 510 according to the second variation of the embodiment of the present invention.

FIG. 8 shows an example of anomaly detection in the web system 510 according to the second variation of the embodiment. The histogram in FIG. 8 shows dissimilarity z obtained from the web system 510 in time-series data. The line graph in FIG. 8 shows the time-series data of threshold $z_{th}$ for the dissimilarity in the case where the percentage $p_c$ of monitored data to be considered normal is 0.5%.

In FIG. 8, the anomaly detecting apparatus 50 detected an anomaly because the dissimilarity z at time $t_A$ exceeded the threshold. Also, at time $t_B$, the anomaly detecting apparatus 50 detected that the normal state is restored from the abnormal state because it had learned the abnormal state online. Thus, the anomaly detecting apparatus 50 can properly update the thresholding condition according to the monitored data which are input in succession.

Figure 9:
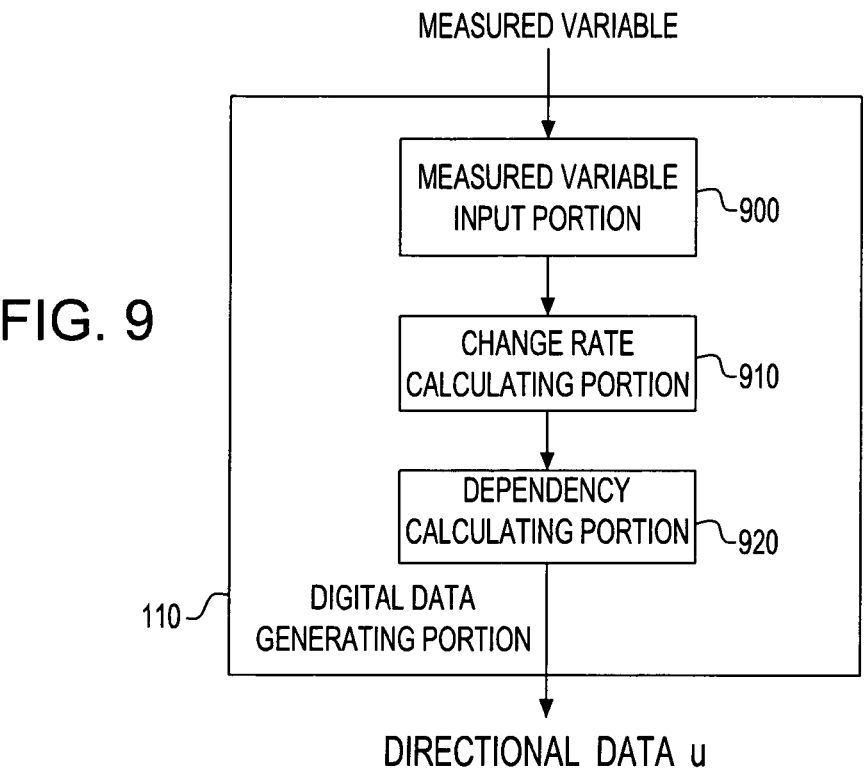
FIG. 9 shows a configuration of a directional data generating portion 110 according to a third variation of the embodiment of the present invention.

FIG. 9 shows a configuration of the directional data generating portion 110 according to a third variation of the present embodiment. The anomaly detecting apparatus 50 according to the present variation has a configuration in which the directional data generating portion 110 in the monitoring system 10 shown in FIG. 1 is replaced with the directional data generating portion 110 shown in FIG. 9.

In this variation, the monitored object 100 is a vehicle such as an automobile or a system such as a manufacturing machine. Input into the anomaly detecting apparatus 50 are, as monitored data, time-series data such as a number of variables measured by various sensors attached to the monitored object 100. The anomaly detecting apparatus detects an anomaly in the monitored object 100 by detecting an anomaly in these measured variables. The monitoring system 10 in this variation has substantially the same functions and configuration as those of the monitoring system 10 shown in FIG. 1 except for the following points, and therefore the description of which will be omitted except for the differences.

The directional data generating portion 110 includes a measured variable input portion 900, a change rate calculating portion 910, and a dependency calculating portion 920. The measured variable input portion 900 inputs time-series data of a plurality of measured variables from the monitored object 100 as monitored data. The change rate calculating portion 910 calculates the change rate in each of the plurality of measured variables in time series which change over time, on the basis of the time-series data of that variable. The dependency calculating portion 920 calculates the degree of association indicating the intensity of association of each of the plurality of measured variables with each of the other measured variables, on the basis of the change rate in that variable and that other variable. The dependency calculating portion 920 then generates directional data u based on the degree of association.

Figure 10:
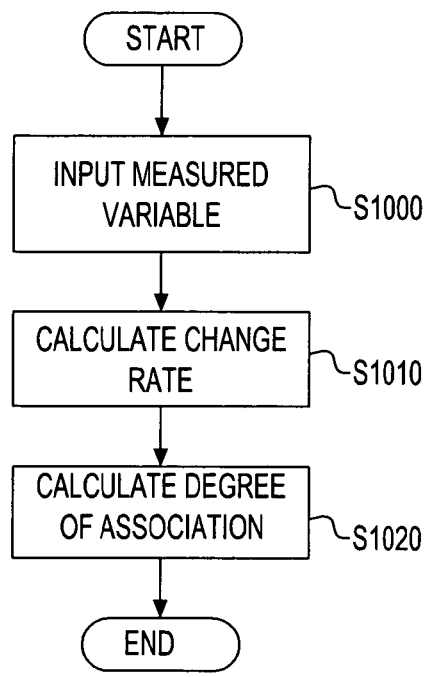
FIG. 10 shows an operation flow in the directional data generating portion 110 according to the third variation of the embodiment of the present invention.

FIG. 10 shows an operation flow in the directional data generating portion 110 according to the third embodiment of the present embodiment.

First, each of a plurality of measured variables from the monitored object 100 is input into the directional data generating portion 110 (S1000). If an anomaly in an automobile, for example, is to be detected by using the anomaly detecting apparatus 50, the measured variable input portion 900 inputs time-series data of a plurality of variables measured by a number of sensors provided in various positions on an automobile, which is the monitored object 100, as the monitored data. Then, the directional data generating portion 110 calculates the change rate in each of the measured variables (S1010).

For example, the change rate calculating portion 910 outputs the change rate at each time in a predetermined measuring time period, which is higher if the transition pattern of the time-series data at that time differs from that of the time-series data measured in a predetermined range of time in the past starting from that time, compared with the case where the transition patterns are identical to each other. An example of a process for calculating the change rate by using the singular-spectrum analysis (SSA, see Non-Patent Documents 10 and 11) will be described in detail.

The change rate calculating portion 910 extracts a consecutive subsequences with the length of N from time-series data $x_1, x_2, \ldots, x_T$. The change rate calculating portion 910 then extracts a consecutive subsequences with a length of M from the extracted consecutive subsequences with a length of N. Further, the change rate calculating portion 910 sequentially changes the position at which it extracts a consecutive subsequences with the length of M in the direction of time lapse, extracts consecutive subsequences with the length of M sequentially, and generates a matrix in which the extracted series are arranged in the column direction as column vectors (Expression (25)). This matrix is called trajectory matrix at time n.

[Expression 25]

$$X^{(n)} = (x_{n+i+j-1})_{i,j=1}^{M,K} = \begin{pmatrix} x_{n+1} & x_{n+2} & \cdots & x_{n+K} \\ x_{n+2} & x_{n+3} & \cdots & x_{n+K+1} \\ \vdots & \vdots & \ddots & \vdots \\ x_{n+M} & x_{n+M+1} & \cdots & x_{n+N} \end{pmatrix} \quad (25)$$

Here, clearly K=N−M+1 holds, and M is N/2. Then, the change rate calculating portion 910 performs singular value decomposition of the matrix to detect a predetermined number (for example λ) of left singular vectors from the maximum singular value side. The matrix in which the detected left singular vectors are arranged in the column direction as the column vectors is called u. The detected left singular vectors indicate the transition pattern of time-series data observed frequently in a given time period in the past starting from that time.

Then, the change rate calculating portion 910 detects time-series data with a length of M in the direction of future from the time-series data it detected as Expression (25). Expression (26) shows the detected time-series data as column vectors.

[Expression 26]

$$X_j^{(n)} = (x_{n+j}, \ldots, x_{n+M+j-1})^T \quad (26)$$

Here, j is an integer greater than n+K. By way of illustration, let j=n+1. In this case, Expression (27) is the projection of the column vectors in Expression (26) into a space spanned by λ singular vectors.

[Expression 27]

$$U^T X_j^{(n)} \quad (27)$$

Noting that a singular vector belonging to the maximum singular value points the most typical direction of the column vector in the trajectory matrix, it is construed that the data at the time point at which the time-series data in Expression (25) was measured is similar to the data at the time point at which the time-series data in Expression (26) was measured if Expression (27), which is the projection, is similar to Expression (26) to which it is projected. On the other hand, if Expression (26) before projection is not similar to Expression (27) after projection, it is construed that the measured variables have changed over time.

Therefore, the change rate calculating portion 910 calculates, as the change rate in time-series data at a certain time, the difference between the length of a vector indicating a set of measured variables near that time and that of the projected vector of that vector that is projected by using the matrix of the singular vectors. For example, the change rate calculating portion 910 calculates the change rate according to Expression (28).

[Expression 28]

$$\frac{1}{M}\left[(X_j^{(n)})^T X_j^{(n)} - (X_j^{(n)})^T U U^T X_j^{(n)}\right] \quad (28)$$

In another example, the change rate calculating portion 910 may calculate the change rate in time-series data at each of a plurality of time points through the above-described process and calculate the average of the calculated change rates. For example, the change rate calculating portion 910 calculates the average value of the change rates in a period between the time n+p+1 and the time n+q according to Expression (29).

[Expression 29]

$$\frac{1}{M(q-p)} \sum_{j=n+p+1}^{n+q} \left[(X_j^{(n)})^T X_j^{(n)} - (X_j^{(n)})^T U U^T X_j^{(n)}\right] \quad (29)$$

Then, the dependency calculating portion 920 calculates the degree of association which indicates the intensity of association of each of a plurality of measured variables with each of other measured variables, on the basis of the change rate of that measured parameter and that other measured parameter (S1020). An example of the calculation process will be described.

First, the dependency calculating portion 920 normalizes the change rate of each measured variable so that the integral of the change rate of that measured variable in a predetermined measuring time period becomes a predetermined unit quantity. For example, let the change rate of a measured variable be x(t) and that of another measured variable be y(t) at time t, where the change rates are always greater than or equal to 0 during the measuring period. The dependency calculating portion 920 normalizes these change rates according to Expression (30) so that the integral of the change rates of these measured variables during the measuring period between time T1 and time T2 becomes 1.

[Expression 30]

$$\tilde{x}(x, y) = \frac{x(t)}{\int_{T1}^{T2} x(t)dt}, \quad \tilde{y}(t) = \frac{y(t)}{\int_{T1}^{T2} y(t)dt} \quad (30)$$

The dependency calculating portion 920 integrates lower one of these normalized change rates at each time in the measuring period to yield the degree of association (Expression (31)).

[Expression 31]

$$\rho(t) = \int_{T1}^{T2} \min(\tilde{x}(t), \tilde{y}(t))dt \quad (31)$$

This degree of association is equivalent to the area of the overlapping portion of the region that is enclosed by two curves when these normalized change rates are overlaid on the same time series. Consequently, the degree of association takes a value from 0 to 1. Thus, the intensity of association between measured variables in different units based on the same measure can be obtained.

For example, if the number of variables is 200, the degree of association is obtained as an association matrix of 200× 200, as given in Expression (31). In some cases, even if a time series of interest is standardized, it may be difficult to directly compare the values of matrix elements of association matrixes obtained in different situations, depending on the trend of change or noise conditions. Therefore, the dependency calculating portion 920 in the present embodiment normalizes an association matrix or distance matrix obtained, by using the Frobenius norm. That is, the dependency calculating portion 920 replaces the elements $a_{i,j}$ of the association matrix as shown in Expression (32).

[Expression 32]

$$a_{i,j} \rightarrow a_{i,j} / \sqrt{\sum_{k,i=1}^{N} a_{k,1}^2} \qquad (32)$$

The dependency calculating portion 920 can obtain directional data u in which the elements of the association matrix are arranged in a raw by normalizing Expression (32).

The anomaly detecting apparatus 50 performs step S230 and the subsequent steps in FIG. 1 on the basis of the directional data u obtained at S1020. For example, if the monitored object 100 is an automobile, the dissimilarity calculating portion 120 calculates the dissimilarity of the directional data u to a reference vector r which is determined based on the time-series data of a plurality of measured variables measured from an automobile being operating properly.

Consequently, the anomaly detecting portion 160 can detect an anomaly in the automobile, which is the monitored object 100, if the dissimilarity z exceeds a threshold $z_{th}$.

Figure 11:
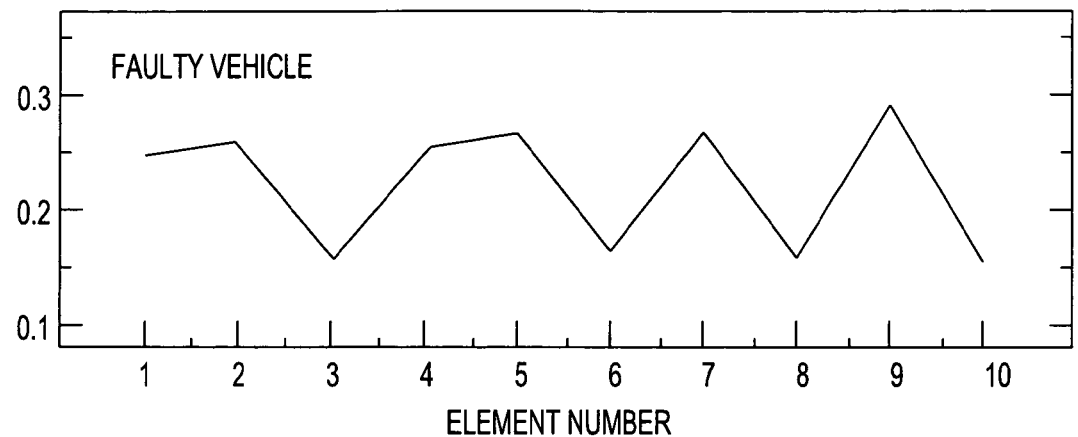
FIG. 11 shows an example of directional data obtained from a properly operating automobile and a faulty automobile according to the third variation of the embodiment of the present invention.
Figure 11:
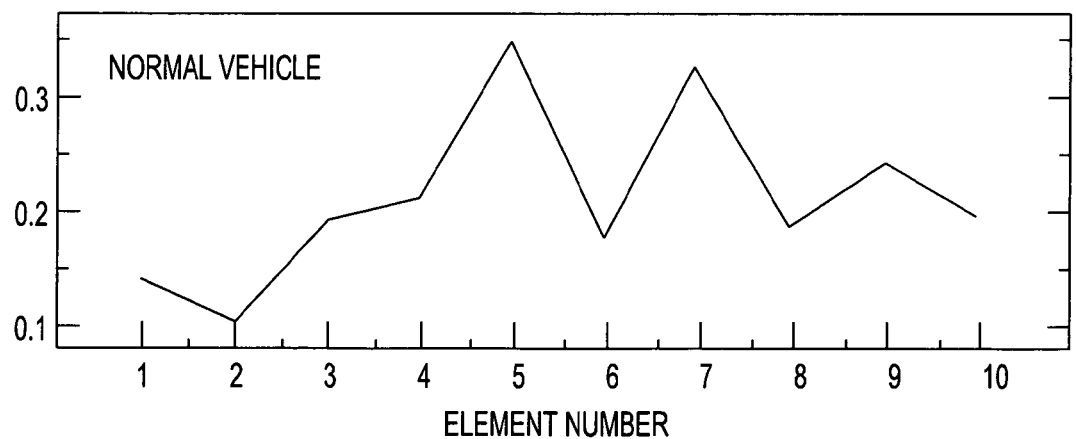
Figure 11:

FIG. 11 shows an example of directional data obtained from a properly operating automobile and a faulty automobile in the third variation of the present embodiment. The directional data in FIG. 11 was obtained by extracting time-series data obtained by using singular spectrum conversion to convert variables measured from the automobiles and arranging the elements of the association matrix calculated for the time-series data.

The first to fifth components of the association matrix are oxygen sensor, throttle positions, engine loads, engine RPMs, and fuel flows. The diagonal elements of the association matrix were not included in the directional data but zeroed when the association matrix was converted into the directional data u and the other ten ($=_5C_2$) elements were arranged as the directional data u. Element numbers 1 to 10 denote (1, 2), (1, 3), (1, 4), (1, 5), (2, 3), (2, 4), (2, 5), (3, 4), (3, 5), and (4, 5) elements, respectively.

As shown in FIG. 11, anomaly detection can be performed with the anomaly detecting apparatus 50 according to the present embodiment by collecting a large amount of data from a properly operating automobile and generating the reference vector r. That is, the anomaly detecting apparatus 50 can detect an anomaly if the dissimilarity z of directional data u to the reference vector r exceeds the threshold $z_{th}$ calculated based on the percentage $p_c$ of a critical region.

Conversely, the anomaly detecting apparatus 50 can function as a case-based reasoning engine that properly reflects changes of the reference vector r associated with accumulation of cases by generating the reference vector r based on various cases of failure in an automobile. That is, the cause of a failure can be reasoned by classifying the directional data obtained on the failure as a known case of failure, as in a text classification.

Figure 12:
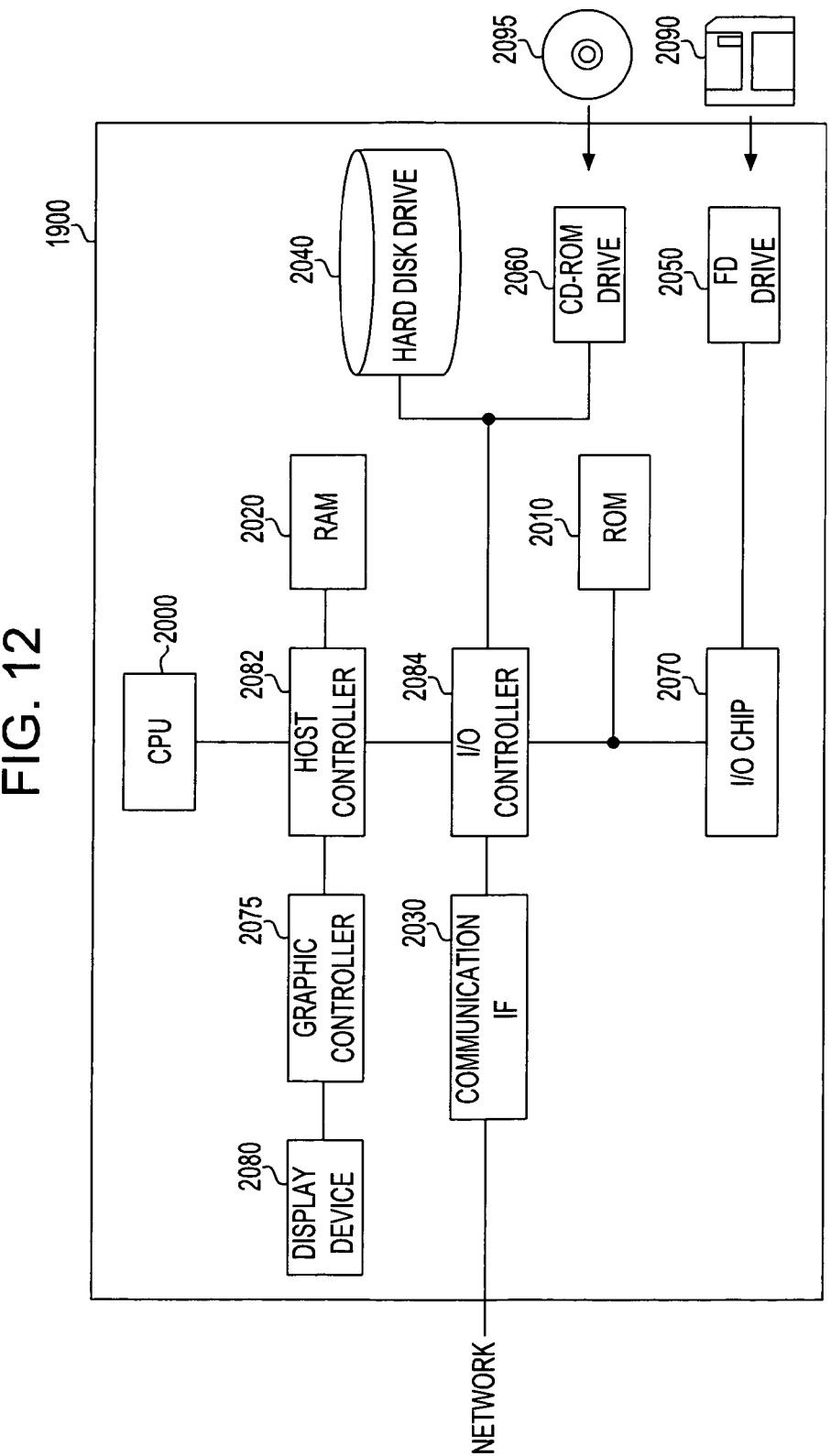
FIG. 12 shows an exemplary configuration of a computer 1900 according to the embodiment.

FIG. 12 shows an exemplary configuration of a computer 1900 relating to the present embodiment. The computer 1900 relating to the present embodiment includes a CPU section including a CPU 2000, a RAM 2020, a graphic controller 2075, and display device 2080 interconnected through a host controller 2082, an input-output section including a communication interface 2030, a hard disk drive 2040, and a CD-ROM drive 2060, which are connected to the host controller 2082 through an input-output controller 2084, and a legacy input-output section including a ROM 2010, a flexible-disk drive 2050, an input-output chip 2070, which are connected to the input-output controller 2084.

The host controller 2082 connects the RAM 2020 with the CPU 2000 and the graphic controller 2075, which access the RAM 2020 at higher transfer rates. The CPU 2000 operates according to programs stored in the ROM 2010 and the RAM 2020 to control components of the computer. The graphic controller 2075 obtains image data generated by the CPU 2000 on a frame buffer provided in the RAM 2020 and causes it to be displayed on the display device 2080. Alternatively, the graphic controller 2075 may contain a frame buffer for storing image data generated by the CPU 2000.

The input-output controller 2084 connects the host controller 2082 with the communication interface 2030, the hard disk drive 2040, and the CD-ROM drive 2060, which are relatively fast input/output devices. The communication interface 2030 communicates with external devices through a network. The hard disk drive 2040 stores programs and data used by the CPU 2000 in the computer 1900. The CD-ROM drive 2060 reads a program or data from a CD-ROM 2095 and provides it to the hard disk drive 2040 through the RAM 2020.

Connected to the input-output controller 2084 are relatively slow input/output devices such as the ROM 2010, the flexible-disk drive 2050, and the input-output chip 2060. The ROM 2010 stores a boot program executed by the computer 1900 during boot-up and programs dependent on the hardware of the computer 1900. The flexible-disk drive 2050 reads a program or data from a flexible disk 2090 and provides it to the hard disk drive 2040 through the RAM 2020. The input-output chip 2070 connects the flexible-disk drive 2050, and various input/output devices through ports such as a parallel port, serial port, keyboard port, and mouse port, for example.

A program to be provided to the hard disk drive 2040 through the RAM 2020 is stored on a recording medium such as a flexible disk 2090, a CD-ROM 2095, or an IC card and provided by a user. The program is read from the recording medium, installed in the hard disk drive 2040 in the computer 1900 through the RAM 2020 and executed in the CPU 2000.

The program which is installed in the computer 1900 and causes the computer 1900 to function as the anomaly detecting apparatus 50 includes a directional data generating module, a dissimilarity calculating module, a moment updating module, a parameter calculating module, a threshold calculating module, and an anomaly detecting module. These programs or modules control the CPU 2000 and other components to cause the computer 1900 to function as a directional data generating portion 110, dissimilarity calculating portion 120, moment updating portion 130, parameter calculating portion 140, threshold calculating portion 150, and anomaly detecting portion 160.

The program may also include a category input module and a reconfiguration directing module. These programs or modules control the CPU 2000 and other components to cause the computer 1900 to function as a category input portion 170 and a reconfiguration directing portion 180.

The directional data generating module may include a measured parameter input module, a change rate calculating module, and a dependency calculating module. These programs or modules control the CPU 2000 and other components to cause the computer 1900 to function as a measured variable input portion 900, a change rate calculating portion 910, and a dependency calculating portion 920.

The programs or modules described above may be stored in an external storage medium. The storage medium may be a flexible disk 2090 or a CD-ROM 2095, or an optical recording medium such as a DVD and CD, a magneto-optical recording medium such as an MO, a tape medium, or a semiconductor memory such as an IC card. Alternatively, a storage device such as a hard disk or a RAM provided in a server system connected to a private communication network or the Internet may be used as the recording medium and the programs may be provided from the storage device to the computer 1900 over the network.

While the present invention has been described with respect to embodiments thereof, the technical scope of the present invention is not limited to that described with the embodiments. It will be apparent to those skilled in the art that various modifications or improvements can be made to the embodiment. It will be apparent from the claims that embodiments to which such modifications and improvements are made also fall within the scope of the technical scope of the present invention. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. The methods of the present invention include signal methods, wherein at least one signal is received and/or transmitted in performing one or more steps. The term signal includes transmissions on the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An anomaly detecting apparatus for detecting an anomaly in monitored data, comprising:
    a directional data generating portion for sequentially generating directional data which are unit vectors indicating a feature of each piece of monitored data corresponding to the monitored data which are input in sequence;
    a dissimilarity calculating portion for calculating a dissimilarity of the directional data to a pre-specified reference vector;
    a moment updating portion for updating a moment of the distribution of the dissimilarity appearing when the directional data is modeled with a multi-dimensional probability distribution, on the basis of a moment already calculated and the dissimilarity of the directional data corresponding to a new piece of the monitored data;
    a parameter calculating portion for calculating a parameter determining a variance of the multi-dimensional probability distribution, based on the moment;
    a threshold calculating portion for calculating a threshold of the dissimilarity based on the multi-dimensional probability distribution the variance of which is determined by the parameter; and
    an anomaly detecting portion for detecting an anomaly in the monitored data that corresponds to the dissimilarity if the dissimilarity exceeds the threshold.

2. The anomaly detecting apparatus according to claim 1, wherein the dissimilarity calculating portion calculates the dissimilarity by using an expression:

$$Z = 1 - r^T u,$$

where Z denotes the dissimilarity, r denotes the reference vector, and u denotes the directional data.

3. The anomaly detecting apparatus according to claim 1, wherein the multi-dimensional probability distribution is a von Mises-Fisher distribution; and the distribution of the dissimilarity is approximated to a chi-square distribution.

4. The anomaly detecting apparatus according to claim 3, wherein the parameter calculating portion further calculates a parameter determining an effective dimension of the von Mises-Fisher distribution based on the moment; and
    the threshold calculating portion calculates the threshold of the dissimilarity based on the von Mises-Fisher distribution the effective dimension and the variance of which are predetermined.

5. The anomaly detecting apparatus according to claim 3, wherein:
    the distribution of the dissimilarity is represented by an expression:

$$q(z) = \frac{1}{\Gamma((n-1)/2)} \left(\frac{z}{2\Sigma}\right)^{\frac{n-1}{2}} \exp\left[\frac{-z}{2\Sigma}\right] \frac{1}{z},$$

where z denotes the dissimilarity, $\Gamma(\ )$ denotes a gamma function, n denotes the parameter determining the effective dimension of the von Mises-Fisher distribution, and $\Sigma$ denotes the parameter determining the variance of the von Mises-Fisher distribution; and the moment updating portion calculates a new moment based on the moment already calculated and on the dissimilarity of the directional data corresponding to a new piece of the monitored data by using an expression:

$$<z^k>^{(t)} = (1-\beta)<z^k>^{(t-1)} + \beta z(t)^k,$$

where $<z^k>^{(t)}$ denotes the k-th moment to be calculated newly at time t, $<z^k>^{(t-1)}$ denotes the k-th moment already calculated at time t−1, z(t) denotes the dissimilarity of the directional data corresponding to a new piece of the monitored data at time t, and $\beta$ denotes a forgetting factor.

6. The anomaly detecting apparatus according to claim 5, wherein the parameter calculating portion calculates the parameter determining the effective dimension of the von Mises-Fisher distribution and the parameter determining the variance of the von Mises-Fisher distribution based on the first and second moments of the distribution of the dissimilarity by using an expression:

$$n - 1 = \frac{2\langle z \rangle^2}{\langle z^2 \rangle - \langle z \rangle^{-2}}, \Sigma = \frac{\langle z^2 \rangle - \langle z \rangle^2}{2\langle z \rangle}.$$

7. The anomaly detecting apparatus according to claim 1, wherein the percentage of the monitored data that is to be considered normal is input into the threshold calculating portion and the threshold calculating portion calculates the threshold such that the accumulation of the probabilities that the dissimilarity in the distribution of the dissimilarity corresponding to the multi-dimensional probability distribution the variance of which is determined by the parameter becomes less than or equal to the threshold is equal to the percentage.

8. The anomaly detecting apparatus according to claim 1, wherein the multi-dimensional probability distribution is a multi-dimensional normal distribution and the distribution of the dissimilarity is a chi-square distribution.

9. The anomaly detecting apparatus according to claim 1, wherein:
the anomaly detecting apparatus detects an anomaly in a text classifying device which classifies sequentially input text data into a particular category;
the directional data generating portion sequentially generates the directional data indicating a feature of the text data, correspondingly to each piece of the sequentially input text data;
said dissimilarity calculating portion calculates the dissimilarity of the directional data to the reference vector specified correspondingly to the category;
the anomaly detecting portion detects an anomaly in the text classification device if the dissimilarity corresponding to the text data classified by the text classifying device into the category exceeds the threshold;
the moment updating portion updates the moment of the distribution of the dissimilarity appearing when the directional data is modeled by using a multi-dimensional probability distribution corresponding to the category, if the text data is classified into the category and the dissimilarity does not exceed the threshold;
the parameter calculating portion calculates a parameter determining the variance of the multi-dimensional probability distribution corresponding to the category, based on the moment; and
the threshold calculating portion calculates a threshold of the dissimilarity corresponding to the category, based on the multi-dimensional probability distribution the variance of which is determined by the parameter.

10. The anomaly detecting apparatus according to claim 1, further comprising:
a category input portion for a user to input an instruction as to whether the text data should be classified into the category, if anomaly in the text classifying device is detected; and
a reconfiguration directing portion for directing the text classifying device to reconfigure the text classifying device so as to properly classify a plurality of pieces of text data classified by a user, if an anomaly in the text classifying device has been detected with a frequency higher than or equal to a predetermined frequency.

11. The anomaly detecting apparatus according claim 1, wherein:
the anomaly detecting apparatus detects an anomaly in an information system including a plurality of information processing apparatuses;
transactions sent by each of the information processing apparatuses for requesting for processing of a service provided by another of the information processing apparatuses are input, as the monitored data, into the directional data generating portion and the directional data generating portion sequentially generates the directional data indicating features of the transactions sent in a predetermined period; and
the anomaly detecting portion detects an anomaly in the information system if the dissimilarity exceeds the threshold.

12. The anomaly detecting apparatus according to claim 1, wherein the directional data generating portion comprises:
a measured variable input portion for inputting time-series data of a plurality of measured parameters measured from a monitored object, as the monitored data;
a change rate calculating portion for calculating the time-series change rate at which each of the plurality of measured parameters changes over time based on the time-series data of the measure parameters; and
a dependency calculating portion for calculating the degree of association indicating the intensity of association of each of the plurality of measured parameters with each of the other measured parameters, based on the change rates of that parameter and that other parameter to generate the directional data based on the degree of association.

13. The anomaly detecting apparatus according to claim 1, wherein:
the anomaly detecting apparatus detects an anomaly in an automobile;
the measured variable input portion inputs, as the monitored data, the time-series data of the plurality of measured parameters measured by a plurality of sensors provided in portions of the monitored automobile;
the dissimilarity calculating portion calculates the dissimilarity of the directional data to the reference vector determined based on the time-series data of a plurality of measured parameters measured from a properly operating automobile; and the anomaly detecting portion detects an anomaly in the monitored automobile if the dissimilarity exceeds the threshold.

14. An anomaly detecting method for detecting an anomaly in monitored data, the method comprising:

a directional data generating step of sequentially generating directional data which are unit vectors indicating a feature of each piece of monitored data correspondingly to the monitored data which are input in sequence;

a dissimilarity calculating step of calculating the dissimilarity of the directional data to a pre-specified reference vector;

a moment updating step of updating a moment of the distribution of the dissimilarity appearing when the directional data is modeled with a multi-dimensional probability distribution, based on the moment already calculated and the dissimilarity of the directional data to a new piece of the monitored data;

a parameter calculating step of calculating a parameter determining the variance of the multi-dimensional probability distribution, based on the moment;

a threshold calculating step of calculating a threshold of the dissimilarity based on the multi-dimensional probability distribution the variance of which is determined by the parameter; and an anomaly detecting step of detecting an anomaly in the monitored data that corresponds to the dissimilarity if the dissimilarity exceeds the threshold.

15. A computer program product comprising a non-transitory, computer readable storage medium having computer readable instructions stored thereon that, when executed by a computer, implement a method of detecting an anomaly in monitored data, the method comprising:

sequentially generating, with a directional data generating portion, directional data which are unit vectors indicating a feature of each piece of monitored data corresponding to the monitored data which are input in sequence;

calculating, with a dissimilarity calculating portion, a dissimilarity of the directional data to a pre-specified reference vector;

updating, with a moment updating portion, a moment of the distribution of the dissimilarity appearing when the directional data is modeled with a multi-dimensional probability distribution, on the basis of a moment already calculated and the dissimilarity of the directional data corresponding to a new piece of the monitored data;

calculating, with a parameter calculating portion, a parameter determining a variance of the multi-dimensional probability distribution, based on the moment;

calculating, with a threshold calculating portion, a threshold of the dissimilarity based on the multi-dimensional probability distribution the variance of which is determined by the parameter; and detecting, with an anomaly detecting portion, an anomaly in the monitored data that corresponds to the dissimilarity if the dissimilarity exceeds the threshold.

16. A computer program product comprising a non-transitory, computer readable storage medium having computer readable instructions stored thereon that, when executed by a computer, implement a method of detecting an anomaly in monitored data, the method comprising:

sequentially generating directional data which are unit vectors indicating a feature of each piece of monitored data correspondingly to the monitored data which are input in sequence;

calculating the dissimilarity of the directional data to a pre-specified reference vector;

updating a moment of the distribution of the dissimilarity appearing when the directional data is modeled with a multi-dimensional probability distribution, based on the moment already calculated and the dissimilarity of the directional data to a new piece of the monitored data;

calculating a parameter determining the variance of the multi-dimensional probability distribution, based on the moment;

calculating a threshold of the dissimilarity based on the multi-dimensional probability distribution the variance of which is determined by the parameter; and detecting an anomaly in the monitored data that corresponds to the dissimilarity if the dissimilarity exceeds the threshold.

* * * * *